United States Patent
Jung et al.

(10) Patent No.: US 11,688,924 B2
(45) Date of Patent: Jun. 27, 2023

(54) WIDEBAND ANTENNA DISPOSED IN VEHICLE

(71) Applicant: LG ELECTRONICS INC., Seoul (KR)

(72) Inventors: Kangjae Jung, Seoul (KR); Soyeon Lee, Seoul (KR); Dongjin Kim, Seoul (KR); Byeongyong Park, Seoul (KR); Ilnam Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/592,420

(22) Filed: Feb. 3, 2022

(65) Prior Publication Data
US 2023/0099558 A1 Mar. 30, 2023

(30) Foreign Application Priority Data
Sep. 27, 2021 (WO) ............... PCT/KR2021/013149

(51) Int. Cl.
*H01Q 1/12* (2006.01)
*H04B 1/3822* (2015.01)
*H01Q 5/357* (2015.01)

(52) U.S. Cl.
CPC ........... *H01Q 1/1271* (2013.01); *H01Q 5/357* (2015.01); *H04B 1/3822* (2013.01)

(58) Field of Classification Search
CPC ..... H01Q 1/1271; H01Q 5/357; H04B 1/3822
See application file for complete search history.

(56) References Cited

U.S. PATENT DOCUMENTS

2003/0164800 A1\* 9/2003 Jordan .................. H01Q 21/30
343/713
2016/0134008 A1\* 5/2016 Kim ..................... H01Q 1/1271
343/711
(Continued)

FOREIGN PATENT DOCUMENTS

EP 1868261 12/2007
KR 20080034971 4/2008
(Continued)

OTHER PUBLICATIONS

PCT International Application No. PCT/KR2021/013149, Written Opinion of the International Searching Authority dated Jun. 23, 2022, 9 pages.
(Continued)

*Primary Examiner* — Awat M Salih
(74) *Attorney, Agent, or Firm* — Lee Hong Degerman Kang Waimey

(57) ABSTRACT

An antenna assembly according to an implementation includes a dielectric substrate, a radiator region formed as conductive patterns on the dielectric substrate to radiate a radio signal, a feeding line to apply a signal on the same plane as the conductive patterns of the radiator region, a first ground region disposed at one side surface of the radiator region at one side of the feeding line and also disposed at an upper side of the radiator region in one axial direction, to radiator a signal of a first band, and a second ground region disposed at a lower side of the radiator region in the one axial direction at another side of the feeding line, to radiator a signal of a third band, wherein the radiator region radiates a signal of a second band.

14 Claims, 24 Drawing Sheets

(56) References Cited

U.S. PATENT DOCUMENTS

| | | | |
|---|---|---|---|
| 2017/0033433 A1 | 2/2017 | Winkelmann et al. |
| 2020/0251804 A1 | 8/2020 | Takeuchi et al. |
| 2021/0066801 A1 | 3/2021 | Tsai et al. |

FOREIGN PATENT DOCUMENTS

| | | |
|---|---|---|
| KR | 20100059076 | 6/2010 |
| KR | 20160054848 | 5/2016 |

OTHER PUBLICATIONS

European Patent Office Application Serial No. 22165273.8, Extended European Search Report dated Sep. 15, 2022, 15 pages.

Alsariera et al., "New broadband L-shaped CPW-fed circularly polarized monopole antenna with asymmetric modified ground plane and a couple series-aligning inverted L-shaped strip," AEU—International Journal of Electronics and Communications, Elsevier, Amsterdam, vol. 118, XP86105083, Feb. 2020, 9 pages.

Tang et al., "A Novel Broadband Circularly Polarized Monopole Antenna Based on C-Shaped Radiator," IEEE Antennas and Wireless Propagation Letters, vol. 16, XP11647047, Oct. 2016, 4 pages.

\* cited by examiner (a) LB (b) 800MHz (a) MB/HB (b) 2200MHz (a) UHB (b) 3500MHz $$Z_{in} = R_{in} + jX_{in}$$
$$jX_{in} = j\omega L + \frac{1}{j\omega C}$$

(a)

(b)

(a)

(b)

WIDEBAND ANTENNA DISPOSED IN VEHICLE

CROSS-REFERENCE TO RELATED APPLICATION

Pursuant to 35 U.S.C. § 119, this application claims the benefit of an earlier filing date and right of priority to International Application No. PCT/KR2021/013149, filed on Sep. 27, 2021, the contents of which are hereby incorporated by reference herein in its entirety.

TECHNICAL FIELD

This specification relates to a wideband antenna disposed in a vehicle. One particular implementation relates to an antenna system having a wideband antenna that is made of a transparent material to operate in various communication systems, and to a vehicle having the same.

BACKGROUND

A vehicle may perform wireless communication services with other vehicles or nearby objects, infrastructures, or a base station. In this regard, various communication services can be provided through a wireless communication system to which an LTE communication technology or a 5G communication technology is applied. some of LTE frequency bands may be allocated to provide 5G communication services.

On the other hand, there is a problem in that a vehicle body and a vehicle roof are formed of a metallic material to block radio waves. Accordingly, a separate antenna structure may be disposed on a top of the vehicle body or the vehicle roof. Or, when the antenna structure is disposed on a bottom of the vehicle body or roof, a portion of the vehicle body or roof corresponding to a region where the antenna structure is disposed may be formed of a non-metallic material.

However, in terms of design, the vehicle body or roof needs to be integrally formed. In this case, the exterior of the vehicle body or roof may be formed of a metallic material. This may cause antenna efficiency to be drastically lowered due to the vehicle body or roof.

In order to increase a communication capacity without a change in the exterior design of the vehicle, a transparent antenna may be disposed on glass corresponding to a window of the vehicle. However, antenna radiation efficiency and impedance bandwidth characteristics may be deteriorated due to an electrical loss of the transparent antenna.

Meanwhile, a structure in which an antenna layer with an antenna pattern and a ground layer with a ground pattern are disposed on different planes is generally used. In particular, when operating as a wideband antenna, it is necessary to increase a thickness between the antenna layer and the ground layer. However, for a transparent antenna for a vehicle, an antenna region and a ground region need to be disposed on the same layer. Such an antenna in which the antenna pattern and the ground pattern are disposed on the same layer is difficult to operate as a wideband antenna.

SUMMARY

The present disclosure is directed to solving the aforementioned problems and other drawbacks. The prevent disclosure also describes an antenna made of a transparent material that is capable of operating in a wideband range while providing LTE and 5G communication services.

The present disclosure further describes a wideband antenna structure made of a transparent material that can be implemented in various shapes on a single plane.

The present disclosure further describes a wideband antenna structure made of a transparent material that can reduce a feeding loss and improving antenna efficiency while operating in a wide band.

The present disclosure further describes an antenna structure made of a transparent material that can improve antenna efficiency and can be reduced in size while operating in a wideband range.

The present disclosure further describes a structure in which a transparent antenna having improved antenna efficiency while operating in a wideband range can be disposed at various positions on a window of a vehicle.

The present disclosure further describes improvement of communication performance by arranging a plurality of transparent antennas on glass of a vehicle or a display of an electronic device.

According to those and other advantages of the subject matter described in this application, an antenna assembly may a dielectric substrate, a radiator region configured as conductive patterns on the dielectric substrate to radiate a radio signal, a feeding line configured to apply a signal on the same plane as the conductive patterns of the radiator region, a first ground region disposed at one side surface of the radiator region at one side of the feeding line and also disposed at an upper side of the radiator region in one axial direction to radiate a signal of a first band, and a second ground region disposed at a lower side of the radiator region in the one axial direction at another side of the feeding line, to radiate a signal of a third band. The radiator region may radiate a signal of a second band.

In some implementations, the first ground region may include first side surfaces spaced apart from the feeding line and the radiator region, and second side surfaces that are another side surfaces of the first side surfaces. Boundaries of the first side surfaces may be disposed on the same plane to be spaced apart different gaps from a boundary of the one side surface of the radiator region and a boundary of the upper side of the radiator region, and the boundaries of the first side surfaces or boundaries of the second side surfaces may be recessed.

In some implementations, the one side surface of the radiator region and the first side surface of the first ground region may be formed in a linear structure to face each other with being spaced apart from each other by the same gap, and end portions of another side surface of the radiator region may have a stepped structure with different lengths.

In some implementations, the one side surface of the radiator region and the first side surface of the first ground region may be formed in a stepped structure to face each other with being spaced apart from each other by different gaps, and end portions of another side surface of the radiator region may have a stepped structure with different lengths.

In some implementations, a first boundary of the first side surfaces may face a boundary of the feeding line with being spaced apart therefrom, a second boundary of the first side surfaces may face a boundary of the one side surface of the radiator region with being spaced apart therefrom, and a third boundary of the first side surfaces may face a boundary of the upper side of the radiator region with being spaced apart therefrom.

In some implementations, the feeding line may have a first width and a second width at a first point and a second point different from each other, so as to define a concave portion and a convex portion. The first boundary of the first side surfaces may be spaced apart from the boundary of the feeding line by a first gap at the first point and the second point, such that the concave portion and the convex portion of the feeding line face a convex portion and a concave portion of the first ground region.

In some implementations, the second boundary of the first side surfaces may face a boundary of the one side surface of the radiator region with being spaced apart therefrom by a second gap, and the third boundary of the first side surfaces may face a boundary of the upper side of the radiator region with being spaced apart therefrom by a third gap. The third gap may be larger than the second gap and the second gap may be larger than the third gap.

In some implementations, the concave portion and the convex portion of the feeding line may be disposed to face a convex portion and a concave portion of the second ground region, and a boundary of the convex portion of the feeding line may face a boundary of the concave portion of the second ground region with being spaced apart therefrom by a fourth gap. The fourth gap may be larger than the first gap.

In some implementations, the second ground region may be spaced apart from a boundary of the feeding line by a fourth gap and formed in a rectangular shape having an end portion in parallel to a lower side of the radiator region.

In some implementations, the second ground region may be spaced apart from a boundary of the feeding line by a fourth gap and formed in a triangular shape having a height decreasing from the boundary of the feeding line in one direction so as to increase a distance from the radiator region.

In some implementations, the first ground region may include a first region corresponding to an upper region and having an end portion disposed on a line parallel to one axis on the second side surface so as to have a linear structure, and a second region corresponding to a region lower than the first region and having a shorter length than an end portion of the first region. The second region may be spaced apart from the feeding line and the one side surface of the radiator region, and spaced apart from the upper side of the radiator region.

In some implementations, the first ground region may include a first region corresponding to an upper region and including a plurality of conductive patterns having end portions disposed at different positions on the first side surface, and a second region corresponding to a region lower than the first region and having an end portion spaced apart from a boundary of the radiator region on the first side surface The plurality of conductive patterns may have longer lengths in the one axial direction at an upper position in the first region.

In some implementations, the first ground region may include a first region corresponding to an upper region and including a plurality of conductive patterns having end portions disposed at different positions on the first side surface, and a second region corresponding to a region upper than the first region and having an end portion spaced apart from a boundary of the radiator region on the first side surface. End portions of the plurality of conductive patterns in the first region may have a structure in which a convex portion and a concave portion are defined in an alternating manner.

In some implementations, the first ground region may be configured such that end portions of the second side surfaces are formed at the same point in the first region and the second region so as to reduce an entire width of an antenna.

In some implementations, the radiator region, the feeding line, the first ground region, and the second ground region may be configured in a metal mesh pattern having a plurality of grids electrically connected to one another The antenna assembly may be implemented as a transparent antenna on the dielectric substrate. The radiator region, the feeding line, the first ground region, and the second ground region constituting the transparent antenna may define a CPW structure disposed on the dielectric substrate.

In some implementations, lower end portions of the feeding line, the first ground region, and the second ground region constituting the transparent antenna may be connected on the same plane to a feeding line, a first ground, and a second ground of a bonding part, respectively. The feeding line, the first ground, and the second ground of the bonding part may define a CPW structure disposed on a second dielectric substrate different from the dielectric substrate. The dielectric substrate may be implemented as a transparent substrate and the second dielectric substrate may be implemented as a non-transparent substrate.

An antenna system for a vehicle according to another aspect of the application may be provided. The vehicle may include a conductive vehicle body operating as an electrical ground. The antenna system may include glass constituting a window of the vehicle, a dielectric substrate attached to the glass and having conductive patterns in a form of a mesh grid, a radiator region configured as conductive patterns on the dielectric substrate and configured to radiate a radio signal, a feeding line configured to apply a signal on the same plane as the conductive patterns of the radiator region, a first ground region disposed at one side surface of the radiator region at one side of the feeding line and also disposed at an upper side of the radiator region in one axial direction to radiate a signal of a first band, the radiator region radiating a signal of a second band, and a second ground region disposed at a lower side of the radiator region in the one axial direction at another side of the feeding line, to radiate a signal of a third band.

In some implementations, the first ground region may include first side surfaces spaced apart from the feeding line and the radiator region, and second side surfaces that are another side surfaces of the first side surfaces. Boundaries of the first side surfaces may be disposed on the same plane to be spaced apart different gaps from a boundary of the one side surface of the radiator region and a boundary of the upper side of the radiator region, and the boundaries of the first side surfaces or boundaries of the second side surfaces may be recessed.

In some implementations, the one side surface of the radiator region and the first side surface of the first ground region may be formed in a linear structure to face each other with being spaced apart by the same gap, or in a stepped structure to face each other with being spaced apart by different gaps. End portions of another side surface of the radiator region may have a stepped structure with different lengths.

In some implementations, a first boundary of the first side surfaces may face a boundary of the feeding line with being spaced apart therefrom, a second boundary of the first side surfaces may face a boundary of the one side surface of the radiator region with being spaced apart therefrom, and a third boundary of the first side surfaces may face a boundary of the upper side of the radiator region with being spaced apart therefrom.

The feeding line, the radiator region, the first ground region, and the second ground region may constitute an antenna module. The antenna system for the vehicle may further include a transceiver circuit operably coupled to the antenna module through the feeding line, and configured to control a radio signal of at least one of the first band to the third band to be radiated through the antenna module, and a processor operably coupled to the transceiver circuit and configured to control the transceiver circuit.

In some implementations, the processor may control the transceiver circuit to radiate radio signals of different bands to the feeding line, so as to perform Carrier Aggregation (CA) or Dual Conductivity (DC) through the antenna module. The radio signal of the first band may be radiated through the first ground region, the radio signal of the second band may be radiated through the radiator region, and the radio signal of the third band may be radiated through the second ground region.

Technical effects of a wideband antenna disposed at a vehicle will be described as follows.

In some implementations, an antenna made of a transparent material that operates in a wideband range capable of providing LTE and 5G communication services can be provided by allowing grounds asymmetrically disposed at both sides of a radiator region to operate in different bands.

In some implementations, a transparent antenna made of a transparent material, which has a radiator region including conductive patterns of a stepped structure with different widths so as to form multiple resonance points and can operate in a wideband range, can be provided.

In some implementations, an entire size of a transparent antenna and a feeding loss can be minimized by minimizing a length of feeding lines.

In some implementations, an antenna structure made of a transparent material that can be minimized in antenna size while operating in a wideband range by employing a CPW feeding structure and a radiator structure, in which ground regions are formed in an asymmetric structure, can be provided.

In some implementations, an antenna structure of a transparent material, which can obtain improved antenna efficiency and transparency while operating in a wideband range by implementing conductive patterns in a metal mesh structure and defining a dummy pattern even at a dielectric region, can be provided.

In some implementations, a structure, in which an antenna structure made of a transparent material with improved antenna efficiency while operating in a wideband range can be disposed at various positions, such as an upper, lower, or side region of a front window of a vehicle, can be provided.

In some implementations, communication performance can be improved by arranging a plurality of transparent antennas on glass of a vehicle or a display of an electronic device.

Further scope of applicability of the present disclosure will become apparent from the following detailed description. It should be understood, however, that the detailed description and specific examples, such as the preferred embodiment of the invention, are given by way of illustration only, since various changes and modifications within the spirit and scope of the invention will be apparent to those skilled in the art.

DETAILED DESCRIPTION

Description will now be given in detail according to exemplary implementations disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

An antenna system described herein may be mounted on a vehicle. Configurations and operations according to implementations may also be applied to a communication system, namely, antenna system mounted on a vehicle. In this regard, the antenna system mounted on the vehicle may include a plurality of antennas, and a transceiver circuit and a processor for controlling the plurality of antennas.

Figure 1A:
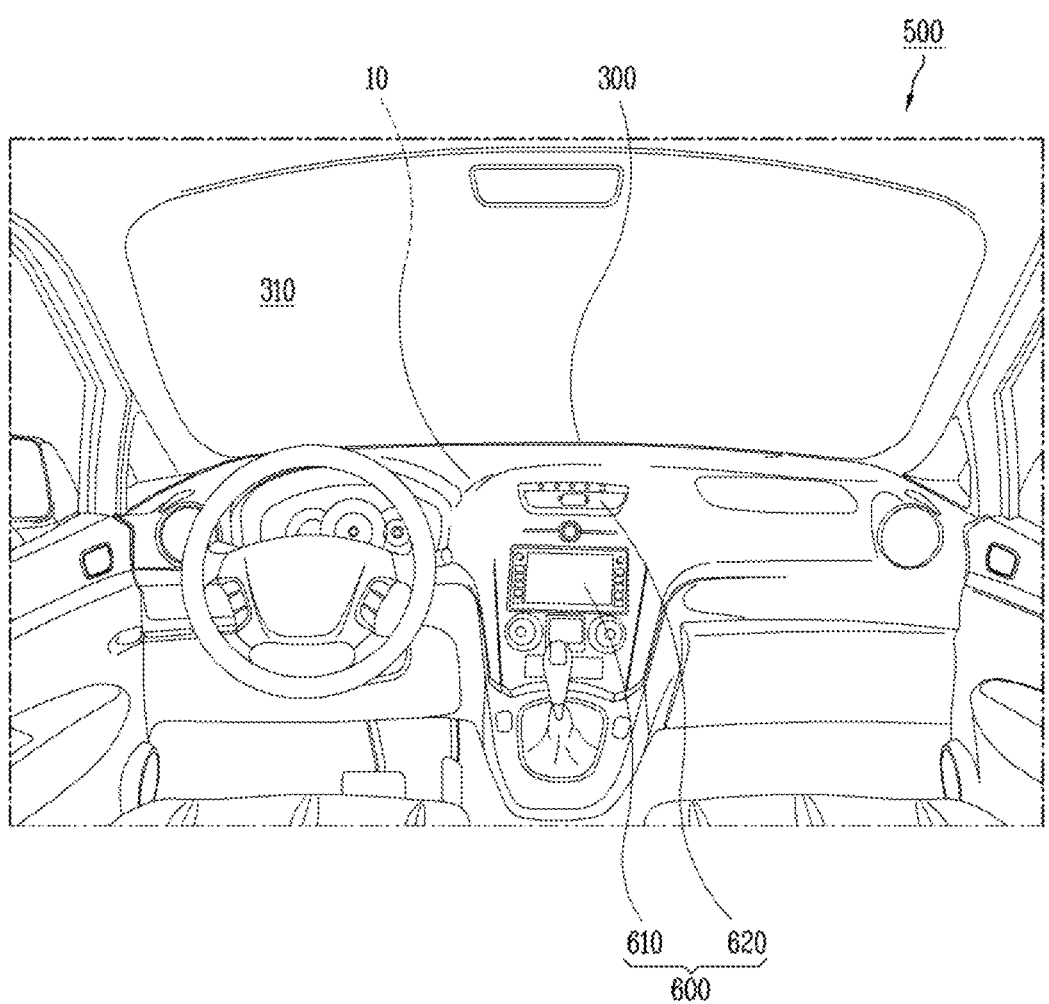
FIG. 1A is a diagram illustrating a vehicle interior in accordance with one example.
Figure 1B:
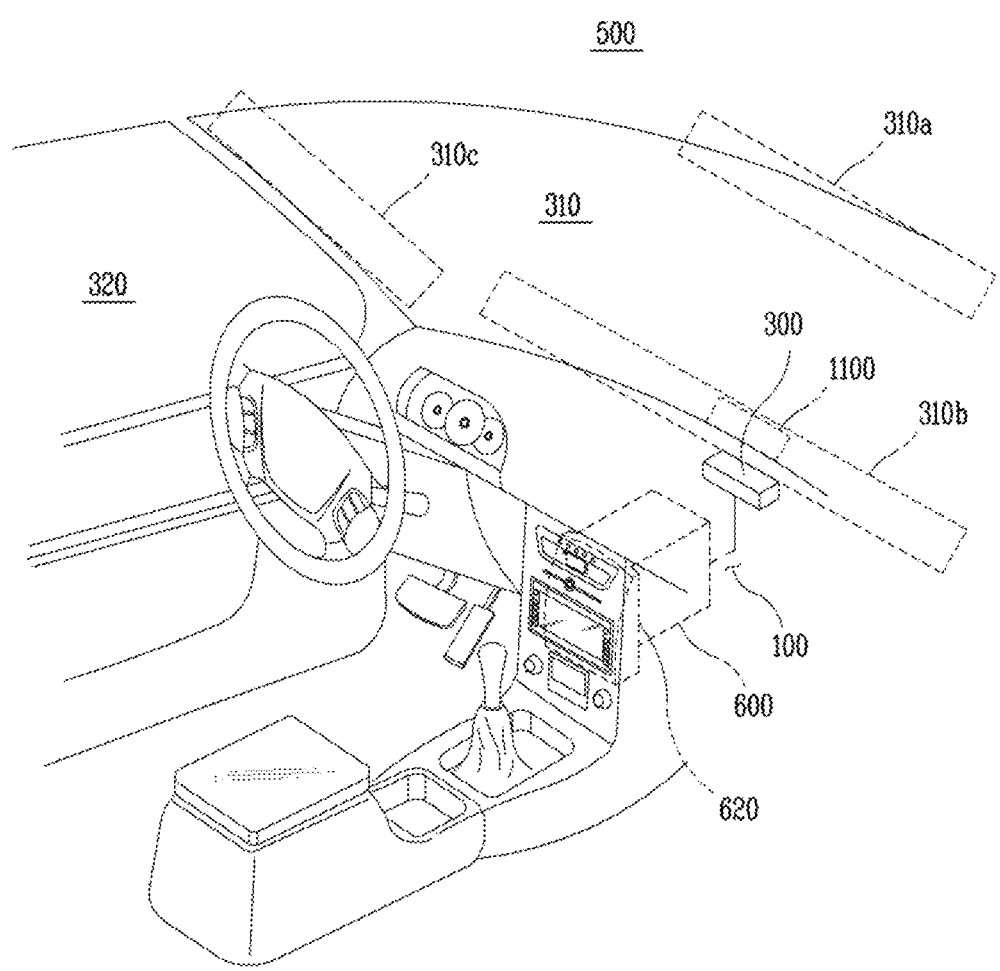
FIG. 1B is a lateral view illustrating the vehicle interior in accordance with the one example.

FIG. 1A is a diagram illustrating a vehicle interior in accordance with one example. FIG. 1B is a lateral view illustrating the vehicle interior in accordance with the one example.

As illustrated in FIGS. 1A and 1B, the present disclosure describes an antenna unit (i.e., an internal antenna system) 1000 capable of transmitting and receiving signals through GPS, 4G wireless communication, 5G wireless communication, Bluetooth, or wireless LAN. Therefore, the antenna unit (i.e., the antenna system) 1000 capable of supporting these various communication protocols may be referred to as an integrated antenna module 1000. The antenna system 1000 may include a telematics control unit (TCU) 300 and an antenna assembly 1100. For example, the antenna assembly 1100 may be disposed on a window of a vehicle.

The present disclosure also describes a vehicle 500 having the antenna system 1000. The vehicle 500 may include a dashboard and a housing 10 including the telematics control unit (TCU) 300, and the like. In addition, the vehicle 500 may include a mounting bracket for mounting the telematics control unit (TCU) 300.

The vehicle 500 may include the telematics control unit (TCU) 300 and an infotainment unit 600 configured to be connected to the telematics control unit 300. A portion of a front pattern of the infotainment unit 600 may be implemented in the form of a dashboard of the vehicle. A display 610 and an audio unit 620 may be included in the dashboard of the vehicle.

The antenna assembly 1100, namely, the antenna module 1100 in the form of a transparent antenna may be disposed at at least one of an upper region 310a, a lower region 310b, and a side region 310c of a front window 310. The antenna assembly 1100 may also be disposed at a side window 320, which is disposed at a side surface of the vehicle, in addition to the front window 310.

As illustrated in FIG. 1B, when the antenna assembly 1100 is disposed at the lower region 310b of the front window 310, it may be operably coupled to a TCU 300 disposed inside the vehicle. When the antenna assembly 1100 is disposed at the upper region 310a or the side region 310c of the front window 310, it may be operably coupled to a TCU disposed outside the vehicle. However, the present disclosure may not be limited to the TCU coupling configuration inside or outside the vehicle.

<V2X (Vehicle-to-Everything)>

V2X communication may include communications between a vehicle and all entities, such as V2V (Vehicle-to-Vehicle) which refers to communication between vehicles, V2I (Vehicle-to-Infrastructure) which refers to communication between a vehicle and an Enb or RSU (Road Side Unit), V2P (Vehicle-to-Pedestrian) which refers to communication between a vehicle and a terminal possessed by a person (pedestrian, cyclist, vehicle driver, or passenger), V2N (vehicle-to-network), and the like.

V2X communication may indicate the same meaning as V2X sidelink or NR V2X or may indicate a broader meaning including V2X sidelink or NR V2X.

V2X communication can be applied to various services, for example, forward collision warning, automatic parking system, Cooperative Adaptive Cruise Control (CACC), control loss warning, traffic queue warning, traffic vulnerable safety warning, emergency vehicle warning, speed warning when driving on a curved road, traffic flow control, and the like.

V2X communication may be provided through a PC5 interface and/or a Uu interface. In this case, specific network entities for supporting communications between a vehicle and all entities may exist in a wireless communication system supporting V2X communication. For example, the network entity may include a base station (Enb), a Road Side Unit (RSU), a terminal, or an application server (e.g., a traffic safety server).

In addition, a terminal performing V2X communication may refer to not only a general handheld UE but also a vehicle (V-UE), a pedestrian UE, an RSU of an Enb type, an RSU of a UE type, a robot equipped with a communication module, and the like.

V2X communication may be performed directly between terminals or may be performed through the network entity (entities). V2X operation modes may be classified according to a method of performing such V2X communication.

Terms used in V2X communication may be defined as follows.

A Road Side Unit (RSU) is a V2X service enabled device that can transmit and receive data to and from a moving vehicle using V2I service. The RSU is also a stationary infrastructure entity supporting V2X application programs, and can exchange messages with other entities that support V2X application programs. The RSU is a term frequently used in existing ITS specifications, and the reason for introducing this term to the 3GPP specifications is to make the documents easier to read for the ITS industry. The RSU is a logical entity that combines a V2X application logic with the functionality of an Enb (referred to as an Enb-type RSU) or a UE (referred to as a UE-type RSU).

V2I Service is a type of V2X service, where one party is a vehicle whereas the other party is an entity belonging to infrastructure. V2P Service is also a type of V2X service, where one party is a vehicle and the other party is a device carried by an individual (e.g., a handheld terminal carried by a pedestrian, a cyclist, a driver, or a passenger). V2X Service is a type of 3GPP communication service that involves a transmitting or receiving device on a vehicle. Based on the other party involved in the communication, it may be further divided into V2V service, V2I service and V2P service.

V2X enabled UE is a UE that supports V2X service. V2V Service is a type of V2X service, where both parties of communication are vehicles. V2V communication range is a direct communication range between two vehicles engaged in V2V service.

Figure 2A:
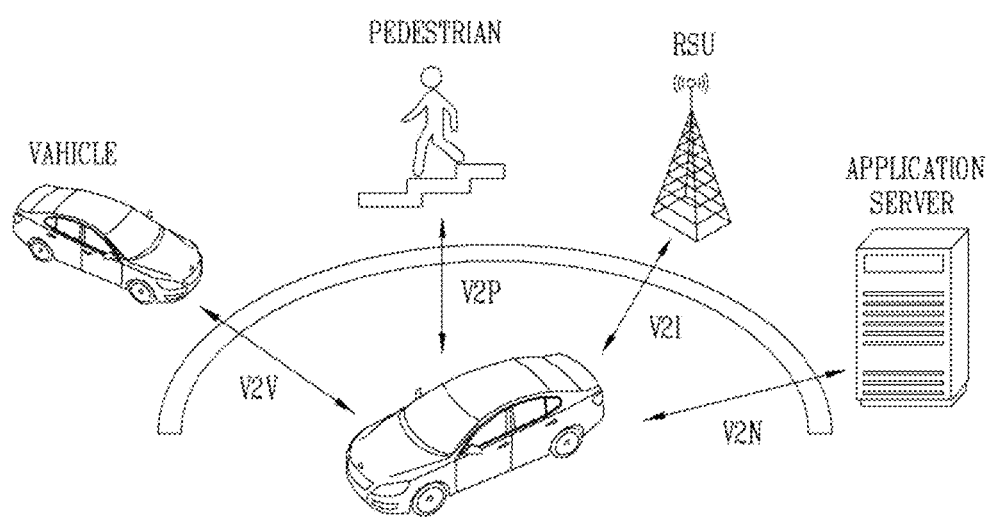
FIG. 2A illustrates a type of V2X application.

V2X applications, referred to as Vehicle-to-Everything (V2X), include the four different types, as described above, namely, (1) vehicle-to-vehicle (V2V), (2) vehicle-to-infrastructure (V2I), (3) vehicle-to-network (V2N), (4) vehicle-to-pedestrian (V2P). FIG. 2A illustrates a type of V2X application. Referring to FIG. 2A, the four types of V2X applications may use "cooperative awareness" to provide more intelligent services for end-users.

This means that entities, such as vehicles, roadside infrastructures, application servers and pedestrians, may collect knowledge of their local environments (e.g., information received from other vehicles or sensor equipment in proximity) to process and share that knowledge in order to provide more intelligent services, such as cooperative collision warning or autonomous driving.

<NR V2X>

Support for V2V and V2X services has been introduced in LTE during Releases 14 and 15, in order to expand the 3GPP platform to the automotive industry.

Requirements for support of enhanced V2X use cases are broadly arranged into four use case groups.

(1) Vehicles Platooning enables the vehicles to dynamically form a platoon traveling together. All the vehicles in the platoon obtain information from the leading vehicle to manage this platoon. These information allow the vehicles to drive closer than normal in a coordinated manner, going to the same direction and traveling together.

(2) Extended Sensors enable the exchange of raw or processed data gathered through local sensors or live video images among vehicles, road site units, devices of pedestrians and V2X application servers. The vehicles can increase the perception of their environment beyond of what their own sensors can detect and have a more broad and holistic view of the local situation. High data rate is one of the key characteristics.

(3) Advanced Driving enables semi-automated or full-automated driving. Each vehicle and/or RSU shares its own perception data obtained from its local sensors with vehicles in proximity and allows vehicles to synchronize and coordinate their trajectories or maneuvers. Each vehicle shares its driving intention with vehicles in proximity too.

(4) Remote Driving enables a remote driver or a V2X application to operate a remote vehicle for those passengers who cannot drive by themselves or remote vehicles located in dangerous environments. For a case where variation is limited and routes are predictable, such as in public transportation, driving based on cloud computing can be used. High reliability and low latency are the main requirements.

A description to be given below can be applied to all of NR SL (sidelink) and LTE SL, and when no radio access technology (RAT) is indicated, the NR SL is meant. Operation scenarios considered in NR V2X may be categorized into six as follows. In this regard, FIG. 2B illustrates a standalone scenario supporting V2X SL communication and an MR-DC scenario supporting V2X SL communication.

In particular, 1) in scenario 1, a Gnb provides control/configuration for a UE's V2X communication in both LTE SL and NR SL. 2) In scenario 2, an ng-Enb provides control/configuration for a UE's V2X communication in both LTE SL and NR SL. 3) In scenario 3, an Enb provides control/configuration for a UE's V2X communication in both LTE SL and NR SL. On the other hand, 4) in scenario 4, a UE's V2X communication in LTE SL and NR SL is controlled/configured by Uu while the UE is configured with EN-DC. 5) In scenario 5, a UE's V2X communication in LTE SL and NR SL is controlled/configured by Uu while the UE is configured in NE-DC. 6) In scenario 6, a UE's V2X communication in LTE SL and NR SL is controlled/configured by Uu while the UE is configured in NGEN-DC.

Figure 2B:
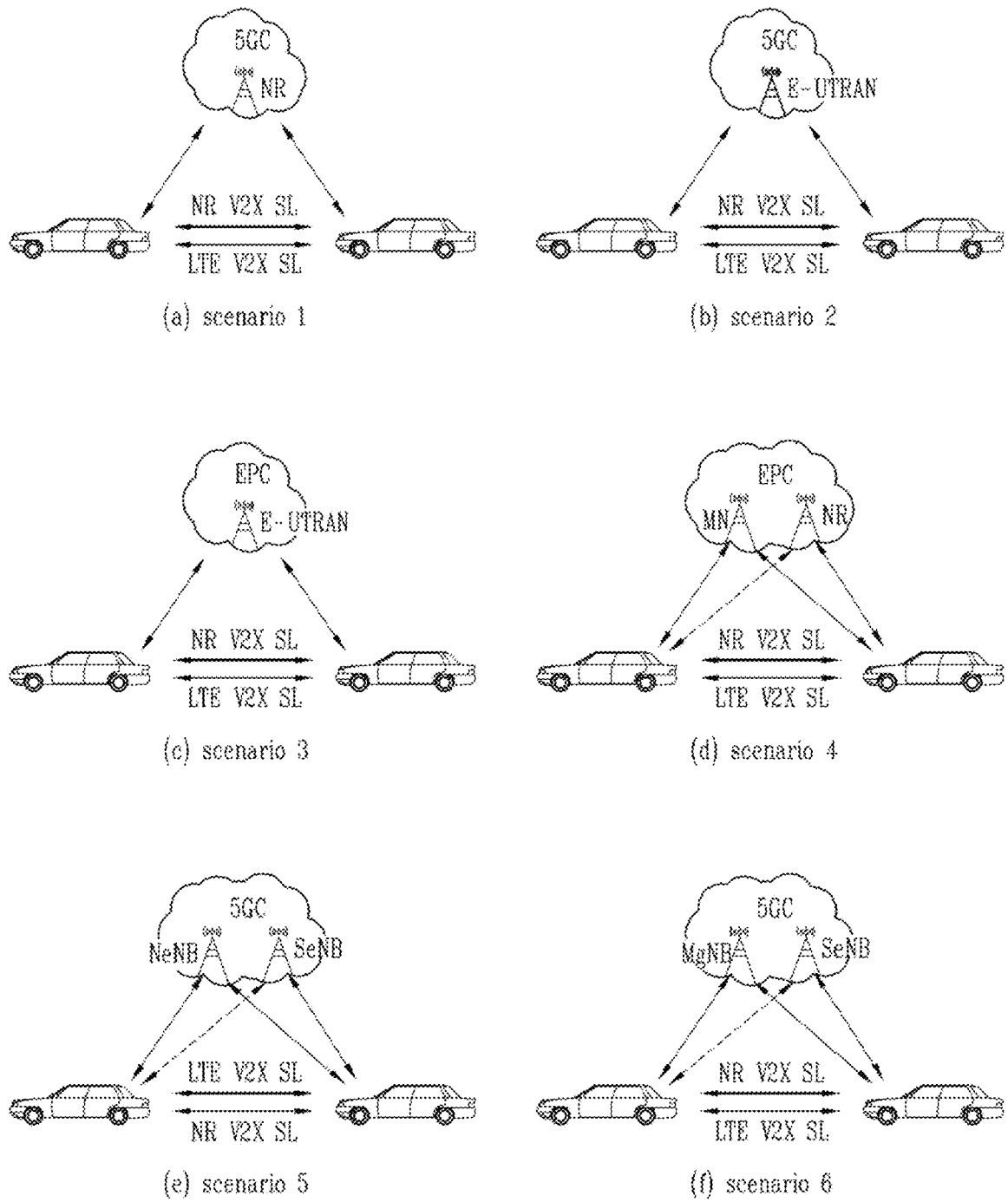
FIG. 2B illustrates a standalone scenario supporting V2X SL communication and an MR-DC scenario supporting V2X SL communication.

In order to support V2X communication, as illustrated in FIGS. 2A and 2B, a vehicle may perform wireless communication with an Enb and/or a Gnb through an antenna system. The antenna system may be configured as an internal antenna system as illustrated in FIGS. 1A and 1B. The antenna system may alternatively be implemented as an external antenna system and/or an internal antenna system as illustrated in FIGS. 3A to 3C.

Figure 3A:
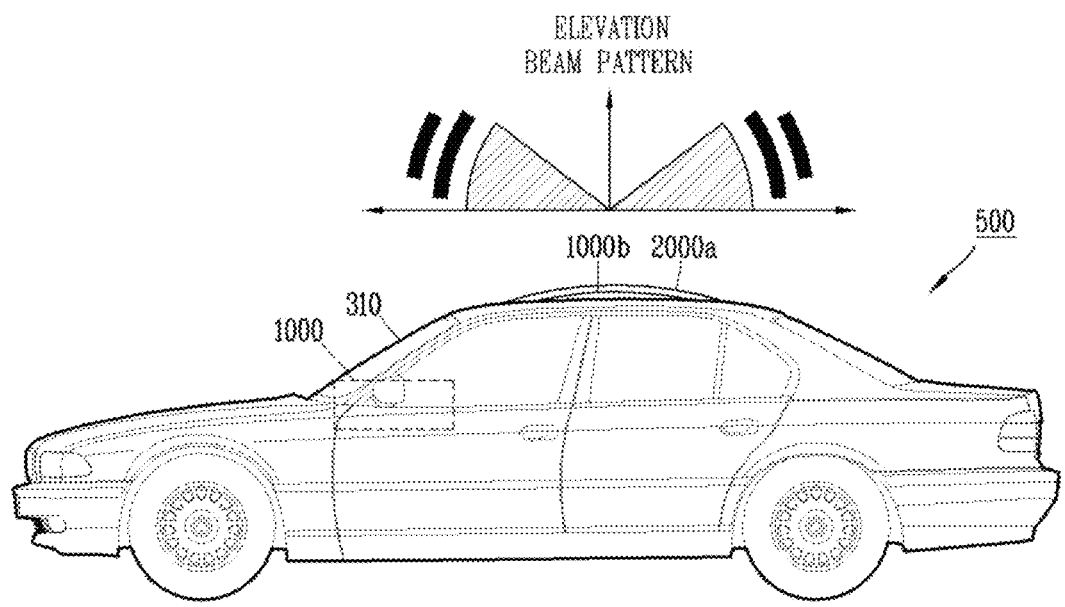
FIGS. 3A to 3C are views illustrating a structure for mounting an antenna system in a vehicle, to which the antenna system is mounted.
Figure 3B:
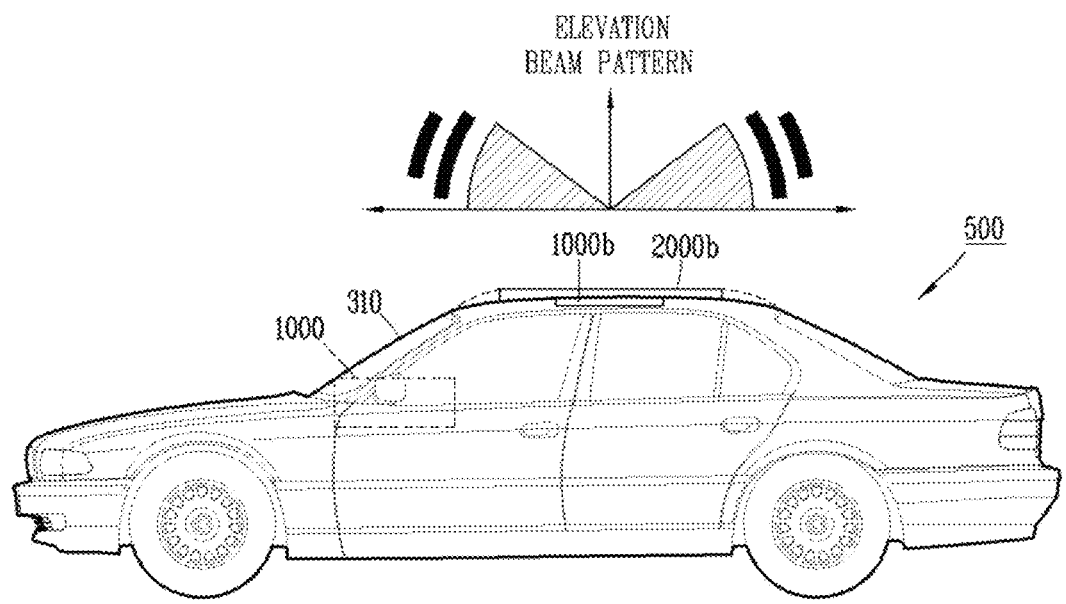
Figure 3C:
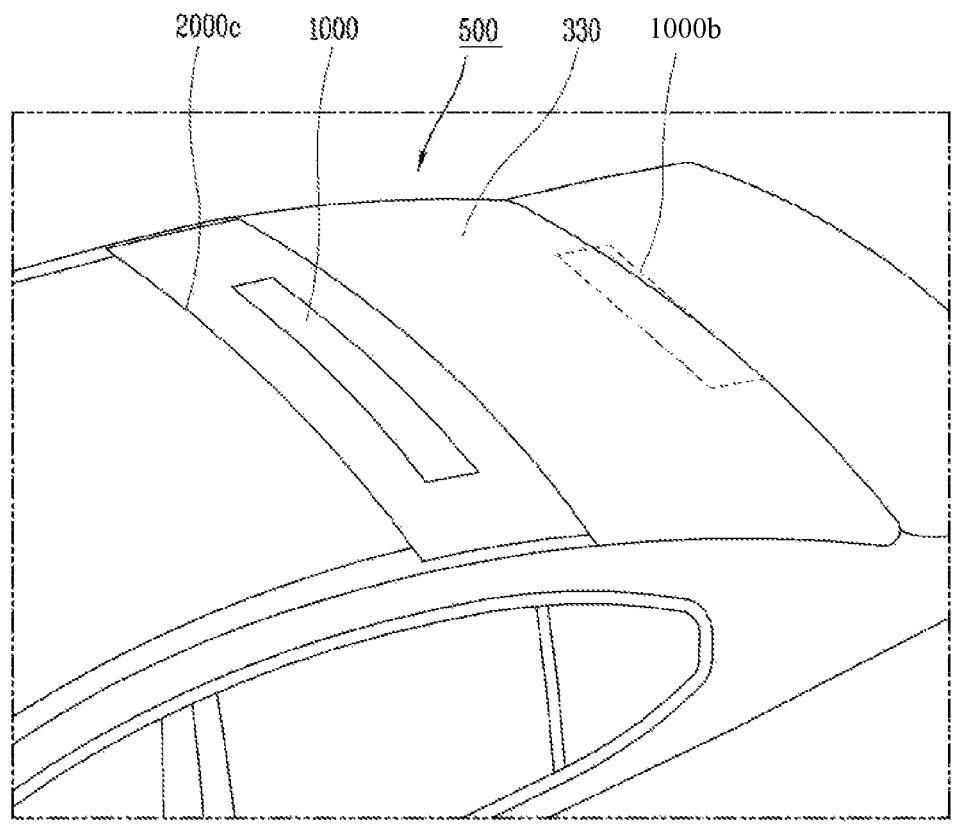

FIGS. 3A to 3C are views illustrating a structure for mounting an antenna system in a vehicle, which includes the antenna system mounted in the vehicle. In this regard, FIGS. 3A to 3C illustrate a configuration capable of performing wireless communication through a transparent antenna disposed on the front window 310 of the vehicle. An antenna system 1000 including a transparent antenna may be disposed on a front window of a vehicle and inside the vehicle. Wireless communication may also be performed through a transparent antenna disposed on a side glass of the vehicle, in addition to the front window.

The antenna system for the vehicle that includes the transparent antenna can be combined with other antennas. Referring to FIGS. 3A to 3C, in addition to the antenna system 1000 implemented as the transparent antenna, a separate antenna system 1000*b* may be further configured. FIGS. 3A and 3B illustrate a structure in which the antenna system 1000*b*, in addition to the antenna system 1000, is mounted on or in a roof of the vehicle. On the other hand, FIG. 3C illustrates a structure in which the separate antenna system 1000*b*, in addition to the antenna system 1000, is mounted in a roof frame of a roof and a rear mirror of the vehicle.

Referring to FIGS. 3A to 3C, in order to improve the appearance of the vehicle and to maintain a telematics performance at the time of collision, an existing shark fin antenna may be replaced with a flat antenna of a non-protruding shape. In addition, the present disclosure proposes an integrated antenna of an LTE antenna and a 5G antenna considering fifth generation (5G) communication while providing the existing mobile communication service (e.g., LTE).

Referring to FIG. 3A, the antenna system 1000 implemented as the transparent antenna may be disposed on the front window 310 of the vehicle and inside the vehicle. The second antenna system 1000b corresponding to an external antenna may be disposed on the roof of the vehicle. In FIG. 3A, a radome 2000a may cover the second antenna system 1000b to protect the second antenna system 1000b from an external environment and external impacts while the vehicle travels. The radome 2000a may be made of a dielectric material through which radio signals are transmitted/received between the second antenna system 1000b and a base station.

Referring to FIG. 3B, the antenna system 1000 implemented as the transparent antenna may be disposed on the front window 310 of the vehicle and inside the vehicle. One the other hand, the second antenna system 1000b corresponding to the external antenna may be disposed within a roof structure of the vehicle and at least part of the roof structure 2000b may be made of a non-metallic material. At this time, the roof structure 2000b of the vehicle except for the at least part made of the non-metallic material may be made of a dielectric material through which radio signals are transmitted/received between the antenna system 1000b and the base station.

Referring to FIG. 3C, the antenna system 1000 implemented as the transparent antenna may be disposed on the rear window 330 of the vehicle and inside the vehicle. The second antenna system 1000b corresponding to the external antenna may be disposed within the roof frame 2000c of the vehicle, and at least part of the roof frame 2000c may be made of a non-metallic material. At this time, the roof frame 2000c of the vehicle 500 except for the at least part made of the non-metallic material may be made of a dielectric material through which radio signals are transmitted/received between the second antenna system 1000b and the base station.

Referring to FIGS. 3A to 3C, antennas provided in the antenna system 1000 mounted on the vehicle may form a beam pattern in a direction perpendicular to the front window 310 or the rear window 330. Antenna provided in the second antenna system 1000b mounted on the vehicle may further define a beam coverage by a predetermined angle in a horizontal region with respect to the vehicle body.

Meanwhile, the vehicle 500 may include only the antenna unit (i.e., the internal antenna system) 1000 corresponding to the internal antenna without the second antenna system 1000b corresponding to the external antenna.

Figure 4:
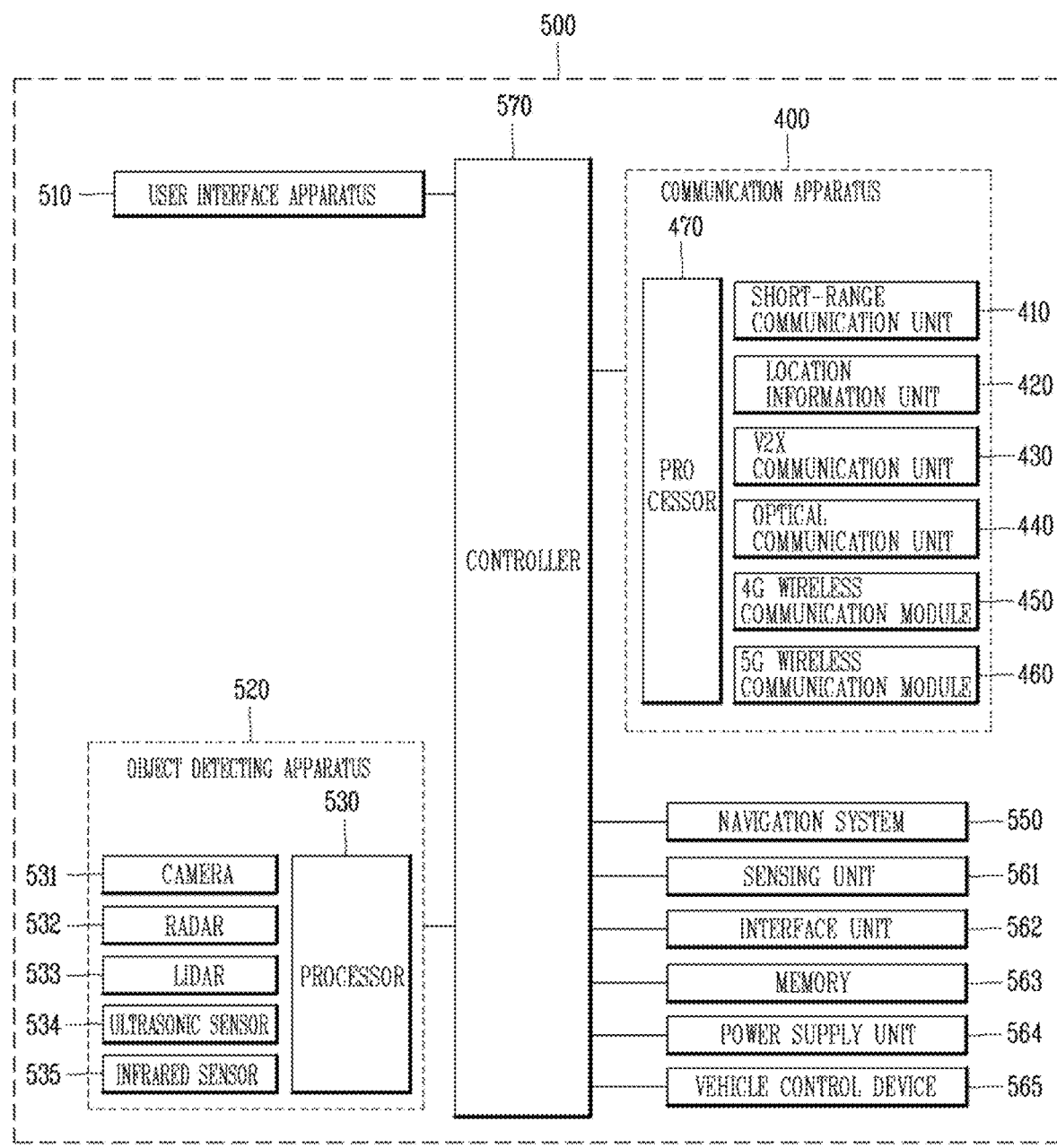
FIG. 4 is a block diagram illustrating a vehicle and an antenna system mounted to the vehicle in accordance with one example.

Meanwhile, FIG. 4 is a block diagram illustrating a vehicle and an antenna system mounted on the vehicle in accordance with an implementation.

The vehicle 500 may be an autonomous vehicle. The vehicle 500 may be switched into an autonomous driving mode or a manual mode (a pseudo driving mode) based on a user input. For example, the vehicle 500 may be switched from the manual mode into the autonomous driving mode or from the autonomous driving mode into the manual mode based on a user input received through a user interface apparatus 510.

In relation to the manual mode and the autonomous driving mode, operations such as object detection, wireless communication, navigation, and operations of vehicle sensors and interfaces may be performed by the telematics control unit mounted on the vehicle 500. Specifically, the telematics control unit mounted on the vehicle 500 may perform the operations in cooperation with the antenna module 300, the object detecting apparatus 520, and other interfaces. In some examples, the communication apparatus 400 may be disposed in the telematics control unit separately from the antenna system 300 or may be disposed in the antenna system 300.

The vehicle 500 may be switched into the autonomous driving mode or the manual mode based on driving environment information. The driving environment information may be generated based on object information provided from the object detecting apparatus 520. For example, the vehicle 500 may be switched from the manual mode into the autonomous driving mode or from the autonomous driving mode into the manual mode based on driving environment information generated in the object detecting apparatus 520.

For example, the vehicle 500 may be switched from the manual mode into the autonomous driving mode or from the autonomous driving mode into the manual mode based on driving environment information received through the communication apparatus 400. The vehicle 500 may be switched from the manual mode into the autonomous driving mode or from the autonomous driving mode into the manual mode based on information, data or signal provided from an external device.

When the vehicle 500 is driven in the autonomous driving mode, the autonomous vehicle 500 may be driven based on an operation system. For example, the autonomous vehicle 500 may be driven based on information, data or signal generated in a driving system, a parking exit system, and a parking system. When the vehicle 500 is driven in the manual mode, the autonomous vehicle 500 may receive a user input for driving through a driving control apparatus. The vehicle 500 may be driven based on the user input received through the driving control apparatus.

The vehicle 500 may include a user interface apparatus 510, an object detecting apparatus 520, a navigation system 550, and a communication apparatus 400. In addition, the vehicle may further include a sensing unit 561, an interface unit 562, a memory 563, a power supply unit 564, and a vehicle control device 565 in addition to the aforementioned apparatuses and devices. In some implementations, the vehicle 500 may include more components in addition to components to be explained in this specification or may not include some of those components to be explained in this specification.

The user interface apparatus 510 may be an apparatus for communication between the vehicle 500 and a user. The user interface apparatus 510 may receive a user input and provide information generated in the vehicle 500 to the user. The vehicle 510 may implement user interfaces (Uis) or user experiences (Uxs) through the user interface apparatus 200.

The object detecting apparatus 520 may be an apparatus for detecting an object located at outside of the vehicle 500. The object may be a variety of objects associated with driving (operation) of the vehicle 500. In some examples, objects may be classified into moving objects and fixed (stationary) objects. For example, the moving objects may include other vehicles and pedestrians. The fixed objects may include traffic signals, roads, and structures, for example. The object detecting apparatus 520 may include a camera 521, a radar 522, a LiDAR 523, an ultrasonic sensor 524, an infrared sensor 525, and a processor 530. In some implementations, the object detecting apparatus 520 may further include other components in addition to the components described, or may not include some of the components described.

The processor 530 may control an overall operation of each unit of the object detecting apparatus 520. The processor 530 may detect an object based on an acquired image, and track the object. The processor 530 may execute operations, such as a calculation of a distance from the object, a calculation of a relative speed with the object and the like, through an image processing algorithm.

In some implementations, the object detecting apparatus 520 may include a plurality of processors 530 or may not include any processor 530. For example, each of the camera 521, the radar 522, the LiDAR 523, the ultrasonic sensor 524 and the infrared sensor 525 may include the processor in an individual manner.

When the processor 530 is not included in the object detecting apparatus 520, the object detecting apparatus 520 may operate according to the control of a processor of an apparatus within the vehicle 500 or the controller 570.

The navigation system 550 may provide location information related to the vehicle based on information obtained through the communication apparatus 400, in particular, a location information unit 420. Also, the navigation system 550 may provide a path (or route) guidance service to a destination based on current location information related to the vehicle. In addition, the navigation system 550 may provide guidance information related to surroundings of the vehicle based on information obtained through the object detecting apparatus 520 and/or a V2X communication unit 430. In some examples, guidance information, autonomous driving service, etc. may be provided based on V2V, V2I, and V2X information obtained through a wireless communication unit 460 operating together with the antenna system 1000.

The communication apparatus 400 may be an apparatus for performing communication with an external device. Here, the external device may be another vehicle, a mobile terminal, or a server. The communication apparatus 400 may perform the communication by including at least one of a transmitting antenna, a receiving antenna, and radio frequency (RF) circuit and RF device for implementing various communication protocols. The communication apparatus 400 may include a short-range communication unit 410, a location information unit 420, a V2X communication unit 430, an optical communication unit 440, a 4G wireless communication module 450, and a processor 470. In some implementations, the communication apparatus 400 may further include other components in addition to the components described, or may not include some of the components described.

The short-range communication unit 410 may be a unit for facilitating short-range communication. The short-range communication unit 410 may construct short-range wireless area networks to perform short-range communication between the vehicle 500 and at least one external device. The location information unit 420 may be a unit for acquiring location information related to the vehicle 500. For example, the location information unit 420 may include a Global Positioning System (GPS) module or a Differential Global Positioning System (DGPS) module.

The V2X communication unit 430 may be a unit for performing wireless communication with a server (Vehicle to Infrastructure; V2I), another vehicle (Vehicle to Vehicle; V2V), or a pedestrian (Vehicle to Pedestrian; V2P). The V2X communication unit 430 may include an RF circuit implementing communication protocols such as V2I, V2V, and V2P. The optical communication unit 440 is a unit for performing communication with an external device through the medium of light. The optical communication unit 440 may include a light-emitting diode for converting an electric signal into an optical signal and sending the optical signal to the exterior, and a photodiode for converting the received optical signal into an electric signal. In some implementations, the light-emitting diode may be integrated with lamps provided on the vehicle 500.

A wireless communication unit may be a unit that performs wireless communication with one or more communication systems through one or more antenna systems. The wireless communication unit may transmit and/or receive a signal to and/or from a device in a first communication system through a first antenna system. In addition, the wireless communication unit 460 may transmit and/or receive a signal to and/or from a device in a second communication system through a second antenna system. For example, the first communication system and the second communication system may be an LTE communication system and a 5G communication system, respectively. However, the first communication system and the second communication system may not be limited thereto, and may be changed according to applications.

In some examples, the antenna module 300 disposed in the vehicle 500 may include a wireless communication unit. In this regard, the vehicle 500 may be an electric vehicle (EV) or a vehicle that can be connected to a communication system independently of an external electronic device. In this regard, the communication apparatus 400 may include at least one of the short-range communication unit 410, the location information unit 420, the V2X communication unit 430, the optical communication unit 440, a 4G wireless communication module 450, and a 5G wireless communication module 460.

The 4G wireless communication module 450 may perform transmission and reception of 4G signals with a 4G base station through a 4G mobile communication network. In this case, the 4G wireless communication module 450 may transmit at least one 4G transmission signal to the 4G base station. In addition, the 4G wireless communication module 450 may receive at least one 4G reception signal from the 4G base station. In this regard, Uplink (UL) Multi-input and Multi-output (MIMO) may be performed by a plurality of 4G transmission signals transmitted to the 4G base station. In addition, Downlink (DL) MIMO may be performed by a plurality of 4G reception signals received from the 4G base station.

The 5G wireless communication module 460 may perform transmission and reception of 5G signals with a 5G base station through a 5G mobile communication network. Here, the 4G base station and the 5G base station may have a Non-Stand-Alone (NSA) structure. The 4G base station and the 5G base station may be disposed in the Non-Stand-Alone (NSA) structure. Alternatively, the 5G base station may be disposed in a Stand-Alone (SA) structure at a separate location from the 4G base station. The 5G wireless communication module 460 may perform transmission and reception of 5G signals with a 5G base station through a 5G mobile communication network. In this case, the 5G wireless communication module 460 may transmit at least one 5G transmission signal to the 5G base station. In addition, the 5G wireless communication module 460 may receive at least one 5G reception signal from the 5G base station. In this instance, 5G and 4G networks may use the same frequency band, and this may be referred to as LTE re-farming. In some examples, a Sub 6 frequency band, which is a range of 6 GHz or less, may be used as the 5G frequency band. On the other hand, a millimeter-wave (mmWave) range may be used as the 5G frequency band to perform wideband high-speed communication. When the mmWave band is used, the electronic device may perform beamforming for communication coverage expansion with a base station.

On the other hand, regardless of the 5G frequency band, 5G communication systems can support a larger number of MIMOs to improve a transmission rate. In this instance, UL MIMO may be performed by a plurality of 5G transmission signals transmitted to a 5G base station. In addition, DL MIMO may be performed by a plurality of 5G reception signals received from the 5G base station.

In some examples, the wireless communication unit 110 may be in a Dual Connectivity (DC) state with the 4G base station and the 5G base station through the 4G wireless communication module 450 and the 5G wireless communication module 460. As such, the dual connectivity with the 4G base station and the 5G base station may be referred to as EUTRAN NR DC (EN-DC). On the other hand, if the 4G base station and 5G base station are disposed in a co-located structure, throughput improvement can be achieved by inter-Carrier Aggregation (inter-CA). Accordingly, when the 4G base station and the 5G base station are disposed in the EN-DC state, the 4G reception signal and the 5G reception signal may be simultaneously received through the 4G wireless communication module 450 and the 5G wireless communication module 460. Short-range communication between electronic devices (e.g., vehicles) may be performed using the 4G wireless communication module 450 and the 5G wireless communication module 460. In some implementations, after resources are allocated, vehicles may perform wireless communication in a V2V manner without a base station.

Meanwhile, for transmission rate improvement and communication system convergence, Carrier Aggregation (CA) may be carried out using at least one of the 4G wireless communication module 450 and the 5G wireless communication module 460 and a WiFi communication module 113. In this regard, 4G+WiFi CA may be performed using the 4G wireless communication module 450 and the Wi-Fi communication module 113. Or, 5G+ WiFi CA may be performed using the 5G wireless communication module 460 and the Wi-Fi communication module 113.

In some examples, the communication apparatus 400 may implement a display apparatus for a vehicle together with the user interface apparatus 510. In this instance, the display apparatus for the vehicle may be referred to as a telematics apparatus or an Audio Video Navigation (AVN) apparatus.

Hereinafter, an antenna assembly (antenna module) that may be disposed on a window of a vehicle according to the present disclosure and an antenna system for a vehicle including the antenna assembly will be described. In this regard, the antenna assembly may refer to a structure in which conductive patterns are combined on a dielectric substrate, and may also be referred to as an antenna module.

Figure 5A:
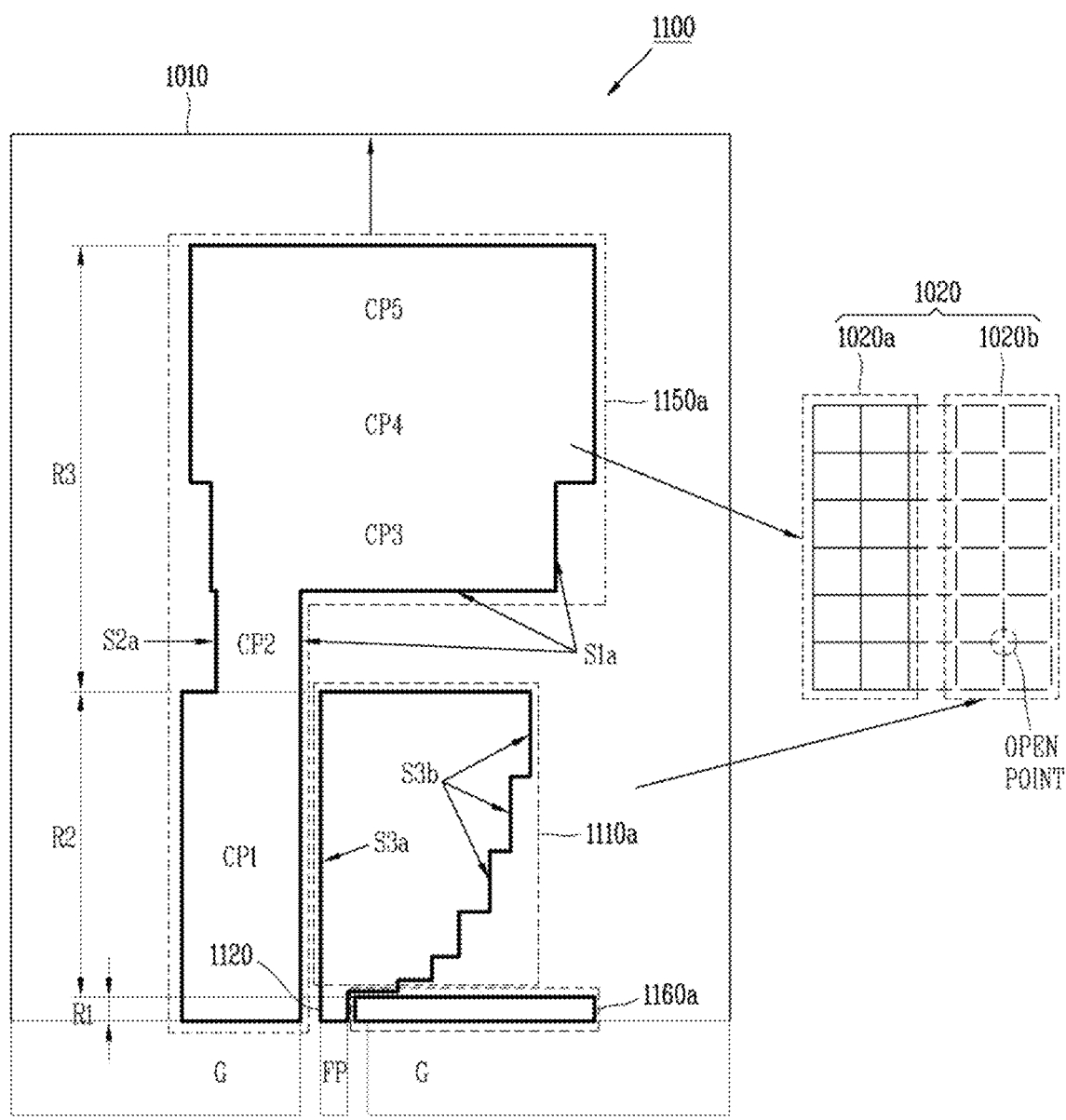
FIGS. 5A and 5B illustrate the configuration of a wideband CPW antenna in accordance with examples.
Figure 5B:
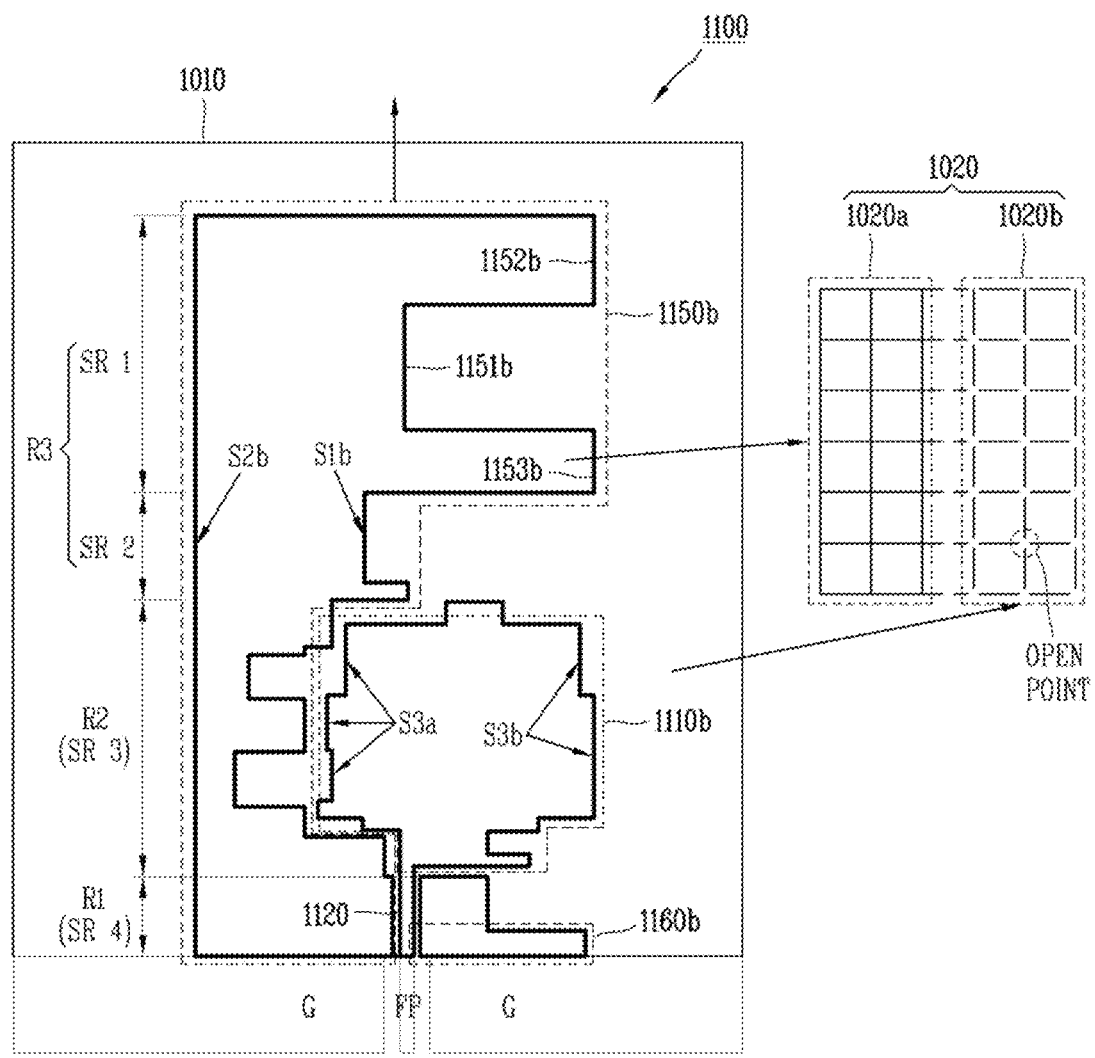

FIGS. 5A and 5B illustrate the configuration of a wideband CPW antenna in accordance with examples. FIG. 5A illustrates a structure of a wideband CPW antenna having an extended ground structure. FIG. 5B illustrates a configuration of a wideband CPW antenna having an extended stepped ground structure.

The extended ground structure of FIG. 5A can allow a design of a small wideband CPW antenna structure. The extended stepped ground structure of FIG. 5B can increase current paths so as to enable the design of the small wideband CPW antenna structure. The first ground region 1150*b* of FIG. 5B may have a narrower width than a width of the first ground region 1150*a* of FIG. 5A. Accordingly, the extended stepped ground structure of FIG. 5B can make the antenna structure smaller than the extended ground structure of FIG. 5A. The first ground region 1150*a*, 1150*b* may be defined as a ground region disposed at one side of the radiator region 1110*a*, 1110*b*.

Hereinafter, an antenna assembly 1100*a*, 1100*b* having a wideband CPW antenna structure according to examples will be described with reference to FIGS. 5A and 5B. An antenna assembly having a wideband CPW structure may also be referred to as an antenna module 1100*a*, 1100*b*.

Referring to FIG. 5A, the antenna assembly 1100*a* may include a dielectric substrate 1010, a radiator region 1110*a*, a feeding line 1120*a*, a first ground region 1150*a*, and a second ground region 1160*a*. Referring to FIG. 5B, the antenna assembly 1100*b* may include a dielectric substrate 1010, a radiator region 1110, a feeding line 1120*b*, a first ground region 1150*b*, and a second ground region 1160*b*.

Hereinafter, common configuration and arrangement structure of the extended ground structure and the extended stepped ground structure will first be described with reference to FIGS. 5A and 5B.

The dielectric substrate 1010 may be configured such that the radiator region 1110*a*, 1110*b*, the feeding line 1120*a*, 1120*b*, the first ground region 1150*a*, 1150*b*, and the second ground region 1160*a*, 1160*b* are disposed on a surface thereof. The dielectric substrate 1010 may be implemented as a substrate having predetermined permittivity and thickness. When the antenna assembly 1100 is implemented as a transparent antenna, the dielectric substrate 1010 may be implemented as a transparent substrate made of a transparent material.

The radiator region 1110*a*, 1110*b* may be implemented as conductive patterns on the dielectric substrate 1010 to radiate radio signals. When the antenna assembly 1100 is implemented as a transparent antenna, the conductive patterns may be configured as a metal mesh grid 1020*a*. That is, the antenna assembly 1100 may be implemented as the metal mesh grid 1020*a* configured to interconnect a plurality of grids. On the other hand, the dummy mesh grid 1020*b* disposed at the dielectric region may be implemented as an open dummy pattern in which a plurality of grids are disconnected at connection points.

The feeding line 1120*a*, 1120*b* may be configured to apply a signal on the same plane as the conductive patterns of the radiator region 1110*a*, 1110*b*. Accordingly, since the radiator region 1110*a*, 1110*b* and the feeding line 1120*a*, 1120*b* are disposed on the same plane, a CPW antenna structure can be implemented.

The first ground region 1150*a*, 1150*b* may be disposed at one side surface of the radiator region 1110*a*, 1110*b* at one side of the feeding line 1120*a*, 1120*b* and also disposed at an upper side of the radiator region 1110*a*, 1110*b* in one axial direction. The one axial direction may be a y-axial direction, but may not be limited thereto. Although it is illustrated that the first ground region 1150*a*, 1150*b* is disposed at the upper side of the radiator region 1110, the present disclosure may not be limited thereto. The first ground region 1150*a*, 1150*b* may alternatively disposed at one side, another side or a lower side of the radiator region 1110*a*, 1110*b* depending on an angle at which the antenna assembly 1100*a*, 1100*b* is disposed.

The second ground region 1160*a*, 1160*b* may be disposed at a lower side of the radiator region 1110*a*, 1110*b* in the one axial direction at another side of the feeding line 1120*a*, 1120*b*. Accordingly, a length of the second ground region 1160*a*, 1160*b* in the one axis may be shorter than a length of the first ground region 1150*a*, 1150*b* in the one axis. The one axial direction may be a y-axial direction, but may not be limited thereto. Although it is illustrated that the second ground region 1160a, 1160b is disposed at the lower side of the radiator region 1110a, 1110b, the present disclosure may not be limited thereto. The second ground region 1160a, 1160b may alternatively disposed at one side, another side or an upper side of the radiator region 1110a, 1110b depending on an angle at which the antenna assembly 1100a, 1100b is disposed.

Since the first ground region 1150a and the second ground region 1160a are disposed on the same plane (i.e., the same dielectric substrate 1010) as the radiator region 1110a, the antenna assembly 1100a illustrated in FIG. 5A can have a CPW antenna structure. Similarly, since the first ground region 1150b and the second ground region 1160b are disposed on the same plane (i.e., the same dielectric substrate 1010) as the radiator region 1110b, the antenna assembly 1100b illustrated in FIG. 5B can have a CPW antenna structure.

In some examples, the wideband CPW antenna may operate as a wideband antenna by the configuration that the conductive patterns radiate radio signals at different bands. The first ground region 1150a, 1150b may be configured to radiate a signal of a first band. The radiator region 1110a, 1110b may be configured to radiate a signal of a second band that is higher than the first band. In some examples, the second ground region 1160a, 1160b may be configured to radiate a signal of a third band that is higher than the second band.

In this regard, the second band may be a band higher than the first band and the third band may be set to a band higher than the second band. For example, the first band corresponding to LB may be set to include 800 MHz, but may not be limited thereto. The second band corresponding to MB/HB may be set to include 2200 MHz, but may not be limited thereto. The third band corresponding to UHB or Sub 6 band may be set to include 3500 MHz, but may not be limited thereto.

The first ground region 1150a, 1150b may include first side surfaces S1a and S1b spaced apart from the feeding line 1120a, 1120b and the radiator region 1110a, 1110b, and second side surfaces S2a and S2b that are another side surfaces of the first side surfaces S1a and Sib. In this regard, the first side surfaces S1a, S1b and the second side surfaces S2a, S2b may define boundaries of conductive patterns (i.e., the metal mesh grid) constituting the first ground region 1150a, 1150b.

Boundaries of the first side surfaces S1a, S1b of the first ground region 1150a, 1150b may be disposed on the same plane to be spaced apart different gaps from a boundary of the one side surface of the radiator region 1110a, 1110b and a boundary of the upper side of the radiator region 1110a, 1110b. The gap between the boundary of the first side surface S1a, S1b of the first ground region 1150a, 1150b and the boundary of the one side surface of the radiator region 1110a, 1110b may be narrower than the gap between the boundary of the first side surface S1a, S1b of the first ground region 1150a, 1150b and the boundary of the upper side of the radiator region 1110a, 1110b. Accordingly, a first region R1 that is an upper region of the first ground region 1150a, 1150b may operate as a more independent radiator than a second region R2 that is a lower region of the first ground region 1150a, 1150b. Therefore, the first ground region 1150a, 1150b can radiate the radio signal of the first band by the first region R1 that has a large area and operates as the independent radiator and the second region R2 adjacent to the radiator region 1110a, 1110b.

In some examples, the boundaries of the first side surfaces S1a, S1b or the boundaries of the second side surfaces S2a, S2b of the first ground region 1150a, 1150b may be recessed. Referring to FIG. 5A, the boundaries of the first side surfaces S1a and the second side surfaces S2a of the first ground region 1150a may be recessed. Referring to FIG. 5B, the boundaries of the first side surfaces S1b of the second ground region 1150b may be recessed.

The configuration that the boundaries of the first side surfaces S1a, S1b or the second side surfaces S2a, S2b are recessed may mean that end portions on one axis are located at different positions. Accordingly, conductive patterns constituting the first ground region 1150a can have different lengths and resonate at different frequencies.

Referring to FIG. 5A, one side surface of the radiator region 1110a and the first side surface of the first ground region 1150a may face each other with being spaced apart from each other at the same gap. An end portion of another side surface of the radiator region 1110a may have a stepped structure having different lengths. The stepped structure of the radiator region 1110a can thus optimize antenna performance at sub bands of the second band. Accordingly, an operating bandwidth of the radiator region 1110a can cover the entire second band.

In the extended stepped ground structure of FIG. 5B, the first third region R3 as the upper region may include a plurality of sub regions SR1 and SR2. In addition, the second region R2 and the first region R1 as the upper lower region may also include a plurality of sub regions SR3 and SR4. The first sub region SR1 may be a region in which a position of an end portion of the first ground region 1150b adjacent to the radiator region 1110b is constant. The second sub region SR2 may be disposed to be spaced apart from one side of the radiator region 1110b, and defined such that end positions of the conductive patterns are different. End portions of conductive patterns at the third sub region SR3 may be located at an inner side rather than end portions of the radiator region 1110b. On the other hand, end portions of some of conductive patterns at the fourth sub region SR4 may be located at an outer side rather than the end portions of the conductive patterns at the third sub region SR3. For example, the end portions of some of the conductive patterns at the fourth sub region SR4 may be located at an outer side rather than the end portions of the radiator region 1120b.

The first ground region 1150a may include the first region R1 and the second region R2. The first region R1 may correspond to the upper region and may include a plurality of conductive patterns CP2 to CP5 having end portions located at different positions on the first side surfaces S1a. The second region R2 may correspond to a region lower than the first region R1 and may have an end portion spaced apart from the boundary of the radiator region 1110a on the first side surface S1a. In the first region R1, the plurality of conductive patterns CP2 to CP5 may have longer lengths at upper positions in the one axial direction.

Referring to FIG. 5B, one side surface of the radiator region 1110b and the first side surface of the first ground region 1150b may have a stepped structure with being spaced apart from each other by different gaps. The stepped structure of the first ground region 1150b can optimize antenna performance at sub bands of the first band. Accordingly, an operating bandwidth of the first ground region 1150b can cover the entire first band.

The radiator region 1110b may have a stepped structure in which an end portion of one side surface of the radiator region 1110b and an end portion of another side surface of the radiator region 1110n have different lengths. The stepped structure of the radiator region 1110b can optimize antenna performance at sub bands of the second band. Accordingly, an operating bandwidth of the radiator region 1110a can cover the entire second band. Also, with the stepped structure in which the one side surface of the radiator region 1110b and the first side surface of the first ground region 1150b are spaced apart from each other by different gaps, a width of the antenna assembly 1100b can be reduced.

The first ground region 1150b may include the first region R1 and the second region R2. The first region R1 may correspond to the upper region and may include a plurality of conductive patterns having end portions located at different positions on the first side surfaces S1b. The second region R2 may correspond to a region lower than the first region R1 and may have an end portion spaced apart from the boundary of the radiator region 1110a on the first side surface S1b.

End portions of the plurality of conductive patterns at the first region R1 may have a structure in which a convex portion and a concave portion are defined in an alternating manner. Here, the structure in which the end portions of the plurality of conductive patterns have the convex portion and the concave portion defined in the alternating manner may mean that the lengths of the end portions are repeatedly increased and decreased. That is, the structure in which the end portions of the plurality of conductive patterns have the convex portion and the concave portion defined in the alternating manner may mean that the end portions are located at an outer side and an inner side with respect to a specific line on the one axis. Accordingly, an entire size of the antenna can be minimized by increasing lengths of current paths formed along the boundaries of the conductive patterns.

In some examples, the first ground region 1150b may be configured such that end portions of the second side surface S2b are formed at the same point in the first region R1 and the second region R2. Accordingly, an entire width of the antenna can be reduced by the first ground region 1150 in which the end portions of the second side surfaces S2b are formed at the same point. As the entire width of the antenna is reduced, an entire size of the antenna can be miniaturized.

Figure 6:
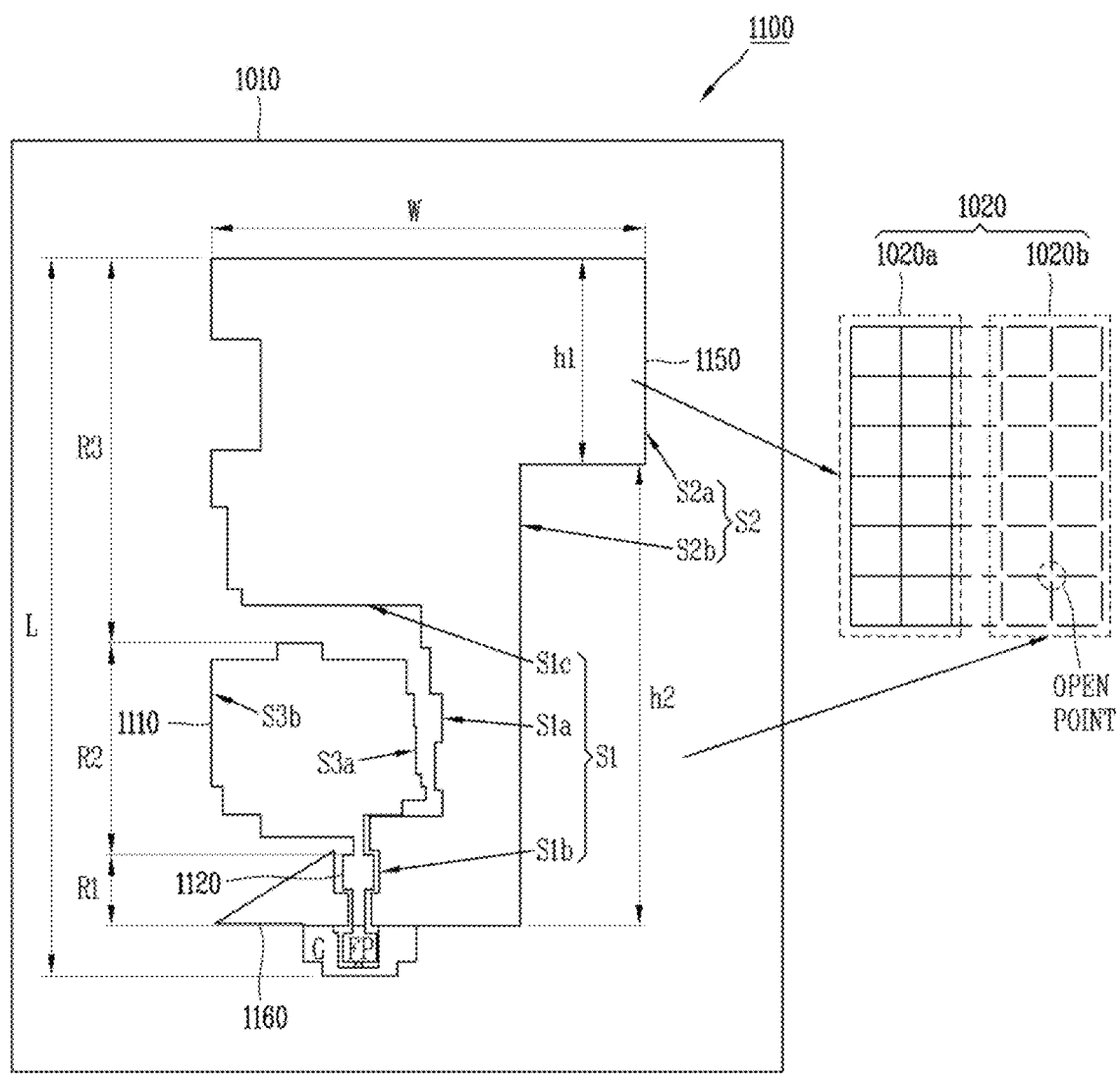
FIG. 6 illustrates a configuration of a stepped wideband CPW antenna in accordance with an example.

In some examples, the structure of the wideband CPW antenna can optimize detailed shapes and detailed arrangement of the feeding line, the first and second ground regions, and the radiator region. FIG. 6 illustrates a configuration of a stepped wideband CPW antenna in accordance with an example. The configuration of the wideband CPW antenna of FIG. 6 is partially similar to the configuration of the wideband CPW antenna of FIG. 5B.

However, the configuration of the wideband CPW antenna of FIG. 6 has a difference in that detailed shapes of the feeding line, the first and second ground regions, and the radiator region are formed in a more elaborate stepped structure. As an example, the configuration of the wideband CPW antenna of FIG. 6 has a difference in that the feeding line 1120 is also formed in a stepped structure. Also, there is a difference in that the second side surface S2 of the first ground region 1150 is also formed in a stepped structure. There is also a difference in that the second ground region 1160 has a triangular structure other than a rectangular structure.

Referring to FIG. 6, an antenna assembly 1100 may include a dielectric substrate 1010, a radiator region 1110, a feeding line 1120, a first ground region 1150, and a second ground region 1160. Hereinafter, the configuration and arrangement of the extended stepped ground structure according to another example will be described with reference to FIG. 6.

The dielectric substrate 1010 may be configured such that the radiator region 1110, the feeding line 1120, the first ground region 1150, and the second ground region 1160 are disposed on a surface thereof. The dielectric substrate 1010 may be implemented as a substrate having predetermined permittivity and thickness. When the antenna assembly 1100 is implemented as a transparent antenna, the dielectric substrate 1010 may be implemented as a transparent substrate made of a transparent material. The radiator region 1110 may be implemented as conductive patterns on the dielectric substrate 1010 to radiate radio signals. When the antenna assembly 1100 is implemented as a transparent antenna, the conductive patterns may be configured as a metal mesh grid 1020a. That is, the antenna assembly 1100 may be implemented as the metal mesh grid 1020a configured to interconnect a plurality of grids. On the other hand, the dummy mesh grid 1020b disposed at the dielectric region may be implemented as an open dummy pattern in which a plurality of grids are disconnected at connection points.

The feeding line 1120 may be configured to apply a signal on the same plane as the conductive patterns of the radiator region 1110. Accordingly, since the radiator region 1110 and the feeding line 1120 are disposed on the same plane, a CPW antenna structure can be implemented. The first ground region 1150 may be disposed at one side surface of the radiator region 1110 at one side of the feeding line 1120 and also disposed at an upper side of the radiator region 1110 in one axial direction. The one axial direction may be a y-axial direction, but may not be limited thereto. Although it is illustrated that the first ground region 1150 is disposed at the upper side of the radiator region 1110, the present disclosure may not be limited thereto. The first ground region 1150 may alternatively disposed at one side, another side or a lower side of the radiator region 1110 depending on an angle at which the antenna assembly 1100 is disposed.

The second ground region 1160 may be disposed at a lower side of the radiator region 1110 in the one axial direction at another side of the feeding line 1120. Accordingly, a length of the second ground region 1160 in the one axis may be shorter than a length of the first ground region 1150 in the one axis. The one axial direction may be a y-axial direction, but may not be limited thereto. Although it is illustrated that the second ground region 1160 is disposed at the lower side of the radiator region 1110, the present disclosure may not be limited thereto. The second ground region 1150 may alternatively disposed at one side, another side or at the upper region of the radiator region 1110 depending on an angle at which the antenna assembly 1100 is disposed. Since the first ground region 1150 and the second ground region 1160 are disposed on the same plane (i.e., the same dielectric substrate 1010) as the radiator region 1110, the antenna assembly 1100 illustrated in FIG. 6 can have a CPW antenna structure.

Figure 7:
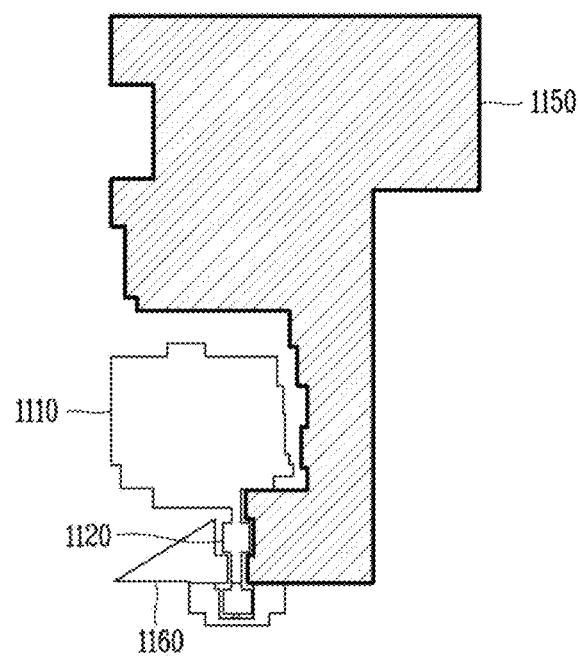
FIGS. 7 to 9 illustrate a main radiator and a surface current distribution for each frequency band in the configuration of the wideband CPW antenna of FIG. 6.
Figure 7:
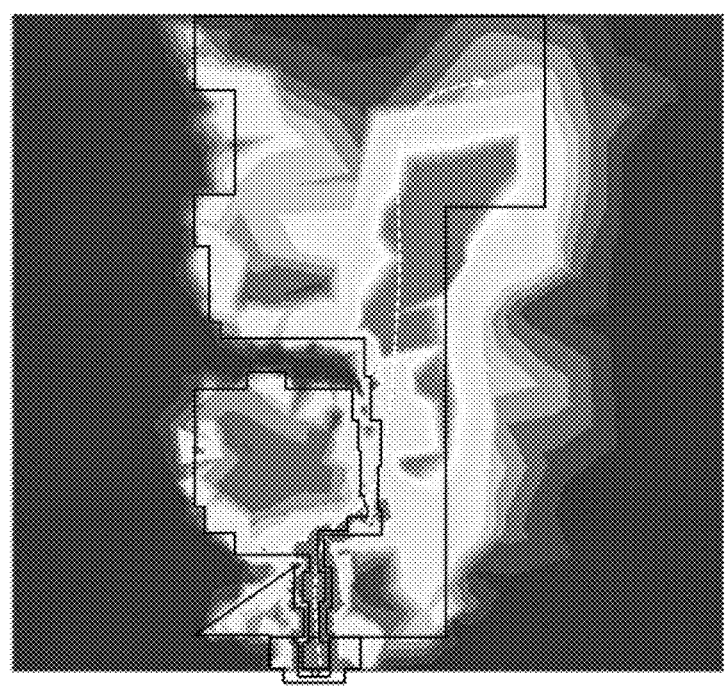
Figure 8:
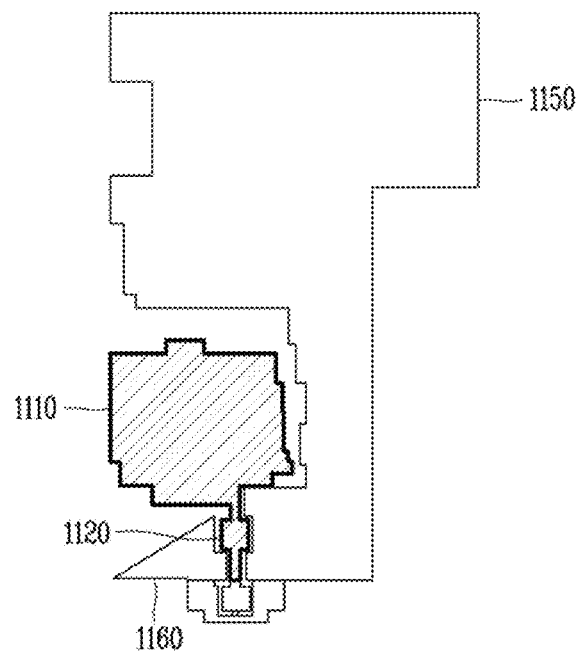
Figure 8:
Figure 9:
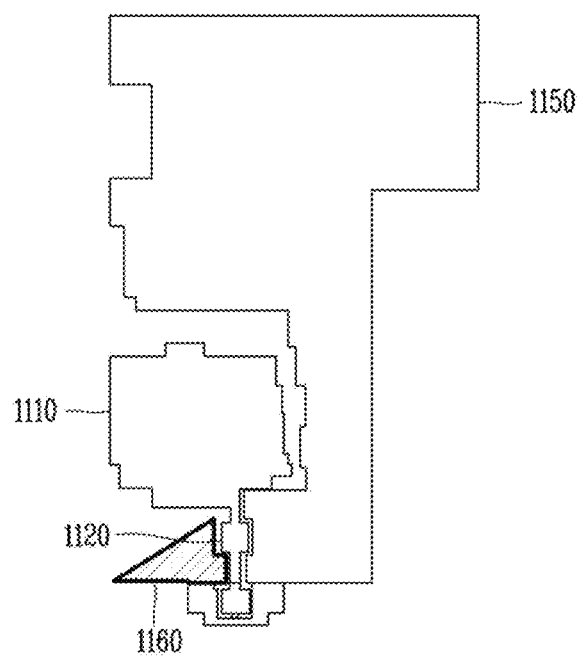
Figure 9:

In some examples, the wideband CPW antenna may operate as a wideband antenna by the configuration that the conductive patterns radiate radio signals at different bands. FIGS. 7 to 9 illustrate a main radiator and a surface current distribution for each frequency band in the configuration of the wideband CPW antenna of FIG. 6.

(a) and (b) of FIG. 7 illustrate a main radiator and a surface current distribution of the first band. Referring to FIG. 6 and (a) of FIG. 7, the first ground region 1150 may operate as a main radiator in the first band LB. Referring to FIG. 6 and (b) of FIG. 7, a large surface current distribution is observed in the first ground region 1150 at 800 MHz in the first band LB. Specifically, the large surface current distribution is observed at 800 MHz in the first region R1 that is the upper region of the first ground region 1150. At 800 MHz, the large surface current distribution is observed in the second side surface S2 of the first region R1 that is the upper region of the first ground region 1150.

(a) and (b) of FIG. 8 illustrate the main radiator and the surface current distribution of the first band. Referring to FIG. 6 and (a) of FIG. 8, the radiator region 1110 may operate as a main radiator in the second band MB/HB. Referring to FIG. 6 and (b) of FIG. 8, the large surface current distribution at 2200 MHz in the second band MB/HB in the radiator region 1110. Specifically, the large surface current distribution is observed at 2200 MHz at one side surface and another side surface of the radiator region 1110. The one side surface and the another side surface of the radiator region 1110 may correspond to radiation edges of the radiator region 1110.

(a) and (b) of FIG. 9 illustrate the main radiator and the surface current distribution of the first band. Referring to FIG. 6 and (a) of FIG. 9, the radiator region 1110 may operate as a main radiator in the third band UHB. Referring to FIG. 6 and (b) of FIG. 9, a large surface current distribution is observed in the second ground region 1160 at 3500 MHz in the third band UHB. Specifically, the large surface current distribution is observed along a side surface of the second ground region 1160 at 3500 MHz. At 3500 MHz, the large surface current distribution is observed at one side surface of the second ground region 1160 adjacent to the feeding line 1110 1120 and a slanted side surface.

Referring to FIGS. 6 to 9, the first ground region 1150 may be configured to radiate a signal of the first band. The radiator region 1110 may be configured to radiate a signal of a second band that is higher than the first band. In some examples, the second ground region 1160 may be configured to radiate a signal of a third band that is higher than the second band. In this regard, the second band may be a band higher than the first band and the third band may be set to a band higher than the second band. For example, the first band corresponding to LB may be set to include 800 MHz, but may not be limited thereto. The second band corresponding to MB/HB may be set to include 2200 MHz, but may not be limited thereto. The third band corresponding to UHB or Sub 6 band may be set to include 3500 MHz, but may not be limited thereto.

Referring to FIGS. 5A to 9, the wideband CPW antenna may be configured such that the first and second ground regions of the CPW antenna are designed in an asymmetric structure. Specifically, the first ground region 1150, 1150a, 1150b may be configured to radiate a radio signal in the first band. The radiator region 1100, 1100a, 1100b may be configured to radiate a radio signal in the second band higher than the first band. The second ground region 1160a may radiate a signal of the third band higher than the second band. Accordingly, the conductive pattern regions spaced apart from one another may operate as main radiators at respective resonant frequencies.

Referring to FIGS. 5A to 9, in the configuration of the wideband CPW antenna, the first side surfaces S1, S1a, S1b of the first ground region 1150, 1150a, 1150b may include first to third boundaries.

The first boundary of the first side surfaces S1, S1a, S1b may be spaced apart from a boundary of the feeding line 1120, 1120a, 1120b to face each other. The second boundary of the first side surfaces S1, S1a, and S1b may be spaced apart from a boundary of one side surface of the radiator region 1110, 1110a, 1110b to face each other. The third boundary of the first side surfaces S1, S1a, S1b may be spaced apart from a boundary of an upper side of the radiator region 1110, 1110a, 1110b to face each other. Accordingly, the first side surfaces S1, S1a, S1b of the first ground region 1150, 1150a, 1150b may be disposed adjacent to different edge portions of the feeding line 1120, 1120a, 1120b and the radiator region 1110, 1110a, 1110b. This can minimize the wideband CPW antenna and enable a wideband operation.

Figure 10:
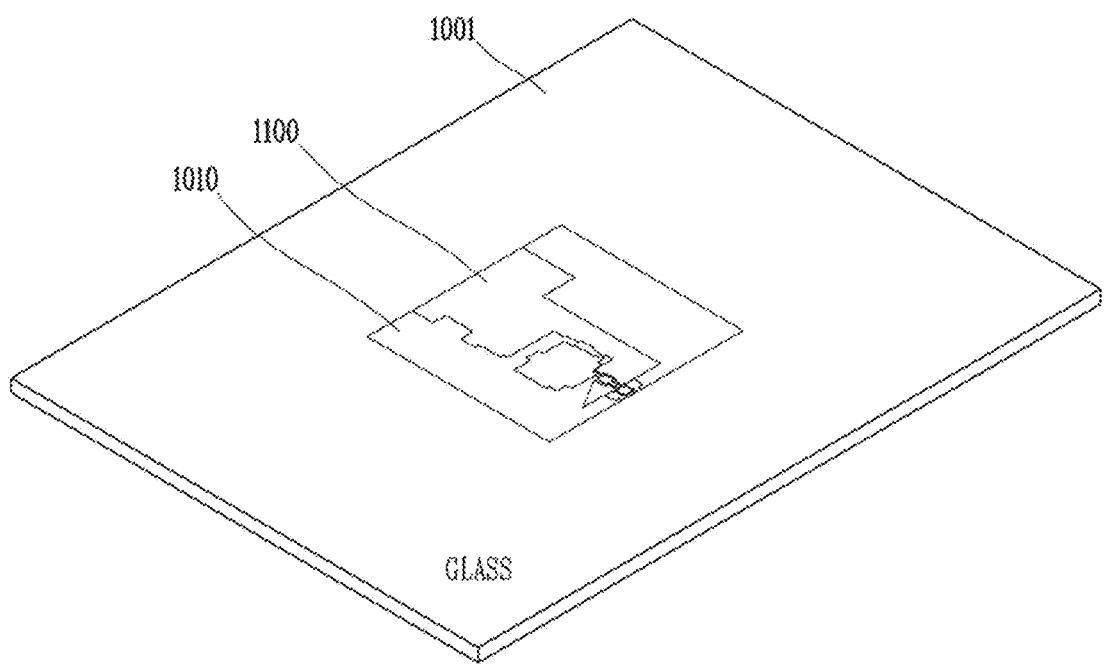
FIG. 10 illustrates a structure in which a dielectric substrate with the wideband CPW antenna structure of FIG. 6 is attached to glass.
Figure 11A:
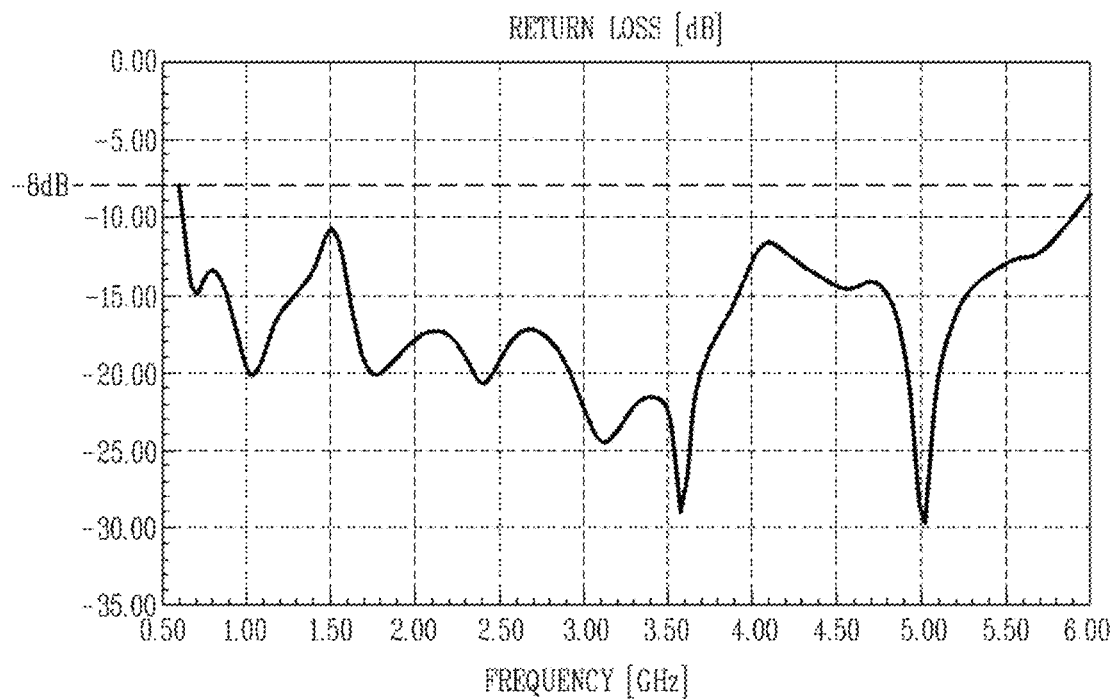
FIGS. 11A and 11B illustrates return loss and efficiency characteristics of the wideband CPW antenna in the structure of FIG. 10 in which the dielectric substrate is attached to the glass.
Figure 11B:
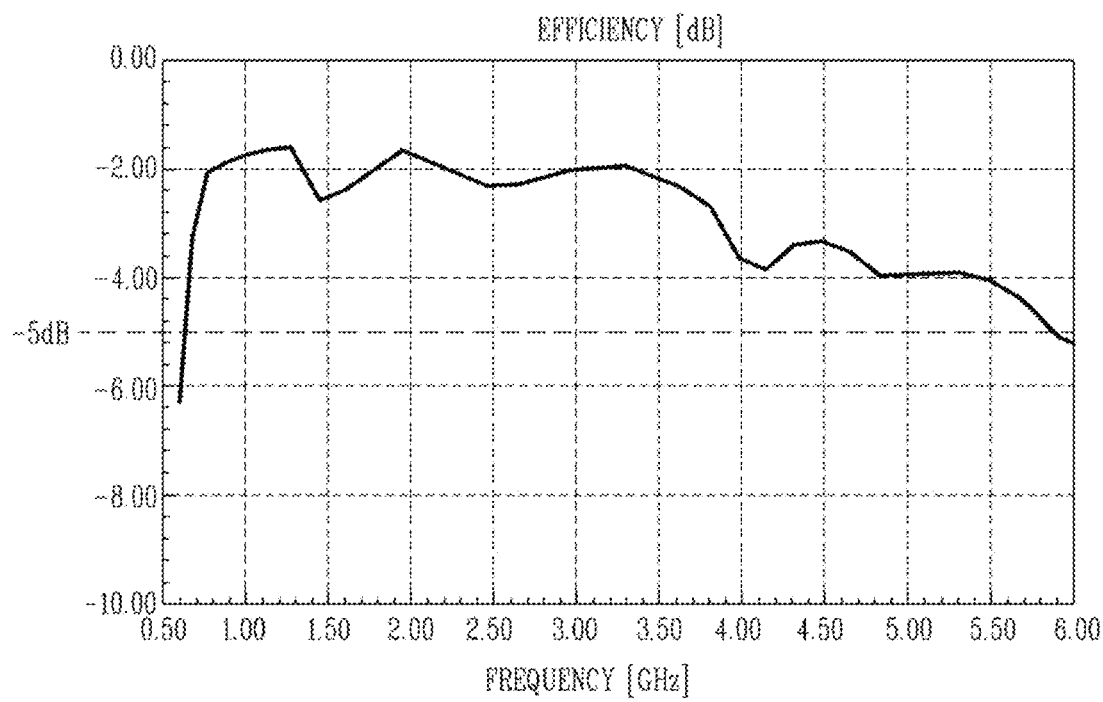

FIG. 10 illustrates a structure in which a dielectric substrate with the wideband CPW antenna structure of FIG. 6 is attached to glass. FIGS. 11A and 11B illustrate return loss and efficiency characteristics of the wideband CPW antenna in the structure of FIG. 10 in which the dielectric substrate is attached to the glass.

Referring to FIG. 10, the dielectric substrate 1010 may be disposed on the glass 1001 or inside the glass 1001. The antenna assembly 1100 may be disposed on a surface of the dielectric substrate 1010. However, the present disclosure may not be limited to the structure of the antenna assembly 1100 of FIG. 6 but may be replaced with the antenna assemblies 1100a and 1100b of FIGS. 5A and 5B. The radiator region 1110 and the first and second ground regions 1150 and 1160 constituting the antenna assembly 1100 may have a metal mesh structure including a plurality of conductive grids.

Referring to FIGS. 6 and 10, a wideband CPW antenna structure having a shape optimized for an asymmetric structure may be implemented with a length of ¼ wavelength or less. As an example, the antenna assembly 1100 corresponding to the wideband CPW antenna structure of FIGS. 6 and 10 may have a length L of 103 mm and a width W of 53 mm. The length L of the antenna assembly 1100 may correspond to about 0.23 wavelength at 680 MHz. The width W of the antenna assembly 1100 may correspond to about 0.12 wavelength at 680 MHz.

Therefore, the wideband CPW antenna structure of FIGS. 6 and 10 can be implemented to have the length of ¼ wavelength or less based on the lowest frequency of the first band, thereby enabling minimization of the antenna. For example, a CPW antenna structure having symmetrical ground regions at one side and another side of a radiator region may be implemented to have a length and a width of about 146 mm and 111 mm, respectively. The CPW antenna structure having such a symmetrical shape may have a length and a width corresponding to about 0.34 wavelength and about 0.26 wavelength.

Accordingly, the structure of the wideband CPW antenna of FIGS. 6 and 10 can be designed to be downsized by about 65% compared to the symmetrical CPW antenna. In particular, the width of the wideband CPW antenna structure of FIGS. 6 and 10 can be reduced to less than a half, thereby reducing a distance between antenna elements when a plurality of antenna elements are disposed for a MIMO operation. Since the wideband CPW antenna structure of FIGS. 6 and 10 has the width reduced to less than the half, interference between the antenna elements can be reduced.

Referring to FIG. 11A, the antenna assembly 1100 having the wideband CPW antenna structure of FIGS. 6 and 10 has a return loss characteristic of −8 Db or less in a wideband range of about 600 MHz to 6 GHz. Therefore, the antenna assembly 1100 having the wideband CPW antenna structure of FIGS. 6 and 10 can radiate a radio signal in the wideband range of about 600 MHz to 6 GHz.

Referring to FIG. 11B, the antenna assembly 1100 having the wideband CPW antenna structure of FIGS. 6 and 10 has an antenna efficiency characteristic of −5 Db or more in a wideband range of about 600 MHz to 6 GHz. Therefore, the antenna assembly 1100 having the wideband CPW antenna structure of FIGS. 6 and 10 can radiate a radio signal in the wideband range of about 600 MHz to 6 GHz.

Figure 12A:
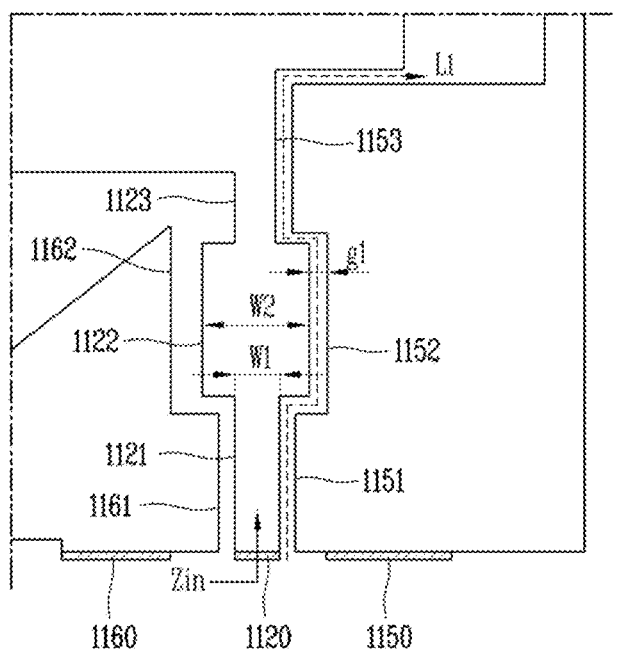
FIG. 12A is an enlarged view of a feeding line part in the wideband CPW antenna structure of FIG. 6.

Referring to FIGS. 5A to 6, the antenna assembly may be configured to maintain a first gap g1 between the feeding line 1120, 1120a, 1120b and the first side surfaces S1, S1a, S1b of the first ground region 1150, 1150a, 1150b. FIG. 12A is an enlarged view of a feeding line part in the wideband CPW antenna structure of FIG. 6.

As illustrated in FIGS. 6 and 10, even the feeding line 1120 having different widths may maintain the first gap g1 from the first side surface S1, S1a, S1b of the first ground region 1150, 1150a, 1150b. Therefore, the antenna assembly may be configured to maintain the first gap g1 between the feeding line 1120, 1120a, 1120b and the first side surfaces S1, S1a, S1b of the first ground region 1150, 1150a, 1150b and have the concave portion and the convex portion disposed alternately.

The feeding line 1120 may be formed with a first width W1 and a second width W2 wider than the first width W1 at a first point and a second point that are different from each other. Accordingly, the feeding line 1120 may include a concave portion 1121 having the first width W1 and a convex portion 1122 having the second width W2. In addition, the feeding line 1120 may further include a concave portion 1123 formed at a third point with a third width W3 that is narrower than the second width W2. The concave portion 1123 of the feeding line 1120 may be connected to the radiator region 1110.

The first boundary of the first side surfaces S1 of the first ground region 1150 may be spaced apart from the boundary of the feeding line 1120 by the first gap g1 at a first point and a second point. The first boundary of the first side surfaces S1 of the first ground region 1150 may be spaced apart from the boundary of the feeding line 1120 by the first gap g1 at first to third points. Accordingly, the concave portions 1121 and 1123 and the convex portion 1122 of the feeding line 1120 can be disposed to complementarily face convex portions 1151 and 1153 and a concave portion 1152 of the first ground region 1150. In addition, the concave portions 1121 and 1123 and the convex portion 1122 of the feeding line 1120 can be disposed to complementarily face a convex portion 1161 and a concave portion 1162 of the second ground region 1160.

Accordingly, the length L1 and the gap g1 at which the boundaries of the feeding line 1120 and the radiator region 1110 corresponding to a gap coupling region and the boundary of the first ground region 1150 face each other may be adjusted such that an imaginary part of an input impedance is close to 0 (Xin≈0). The length L1 and the gap g1 may be determined such that coupling is optimized in the first band LB in a region between the boundaries of the feeding line 1120 and the radiator region 1110 and the boundary of the first ground region 1150. In this regard, when the length L1 of the boundary region increases, an inductance value of the input impedance may increase. In case where the length L1 of the boundary region is constant, when the gap g1 of the boundary region increases, a capacitance value of the input impedance may decrease. As an example, the length L1 and the gap g1 may be designed to be L1=21 mm and g1=0.5 mm to optimize the coupling, but may not be limited thereto.

Figure 12B:
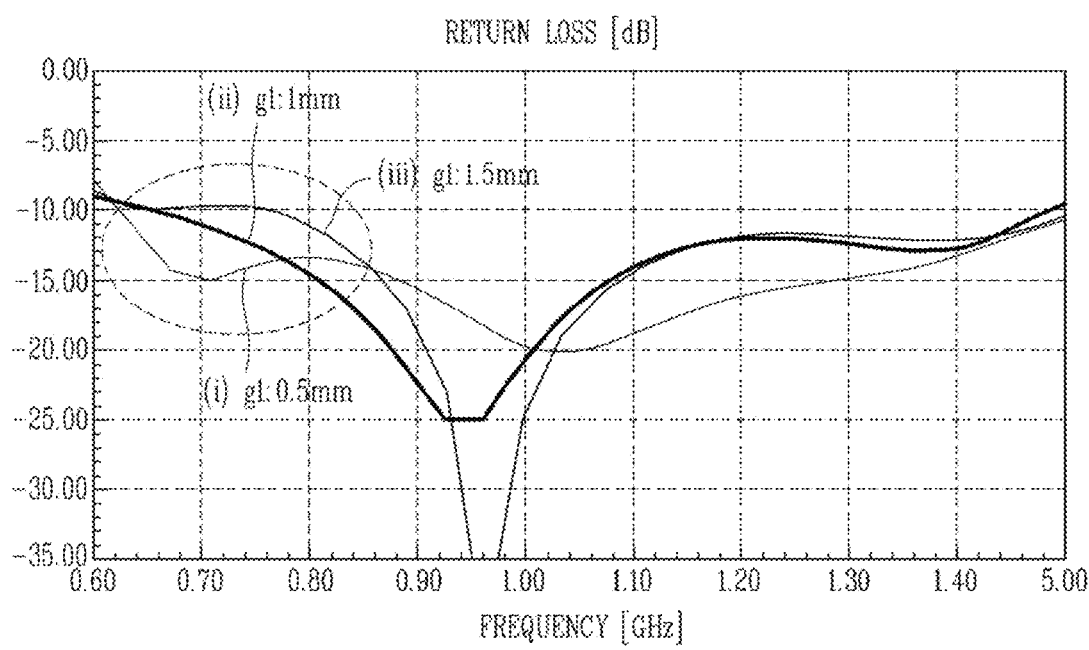
FIG. 12B illustrates the return loss for each frequency according to a change in a gap between a feeding line and a ground region.

FIG. 12B illustrates the return loss for each frequency according to a change in a gap between a feeding line and a ground region. Referring to FIGS. 6, 12A, and 12B, as the gap g1 of the boundary region decreases, a resonance characteristic in a VLB of the first band is improved. For example, in order to improve antenna characteristics in the VLB of the first band, the gap g1 of the boundary region may be set to g1=0.5 mm as described above. In some examples, if g1=1.0 mm or 1.5 mm, an antenna resonance may occur at a frequency slightly lower than about 1 GHz. In this regard, as the gap g1 of the boundary region for the gap coupling increases, the capacitance value of the input impedance may decrease. As the gap g1 of the boundary region increases, Xin>0 in the VLB of the first band, thereby deteriorating the antenna resonance characteristic in the VLB.

In some examples, if g1=0.5 mm, an antenna resonance may occur at a frequency slightly higher than about 1 GHz. However, the antenna resonance characteristic may be maintained even at g1=0.5 mm or at a little narrower gap than this. Accordingly, in order to improve the antenna characteristics in the VLB of the first band, the gap g1 may be set in a predetermined range based on g1=0.5 mm. Alternatively, in order to improve the antenna characteristics in all sub bands within the first band, the gap g1 may be set to a value between 0.5 mm and 1.5 mm.

Figure 13A:
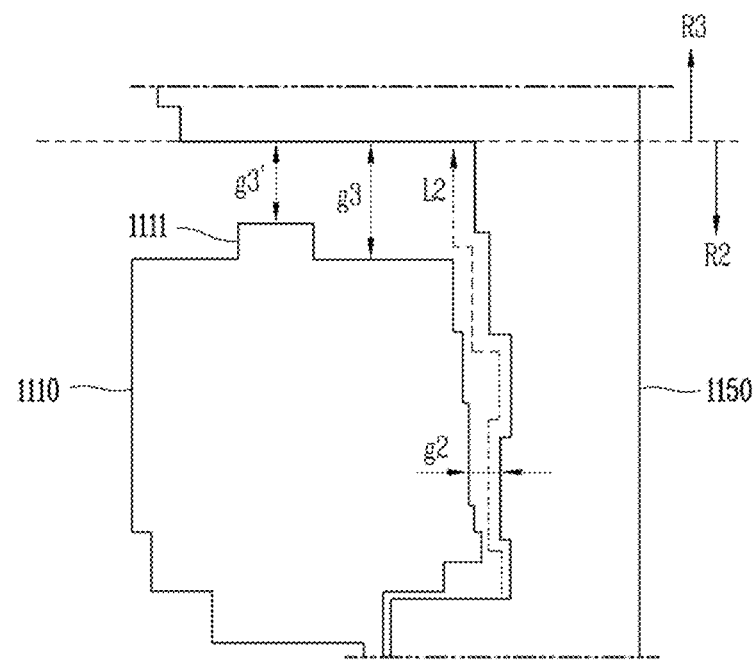
FIG. 13A is an enlarged view illustrating a boundary part between a first ground region and a radiator region facing the first ground region in the asymmetric wideband CPW antenna structure of FIG. 6.

The asymmetric wideband CPW antenna structure can optimize the gap between the radiator region 1110 and the first ground region 1150 surrounding the radiator region 1110 and their shapes. FIG. 13A is an enlarged view illustrating a boundary portion between the first ground region and the radiator region facing the first ground region in the asymmetric wideband CPW antenna structure of FIG. 6. Referring to FIG. 13A, the gap between the radiator region 1110 and the first ground region 1150 surrounding the radiator region 1110 can be adjusted. Accordingly, the radiator region 1110 and the first ground region 1150 surrounding the radiator region 1110 may operate as a tuning region for a resonance frequency adjustment and impedance matching in the first band LB and the second band MB/HB.

Referring to FIGS. 6 and 13A, the second boundary of the first side surfaces S1 may be spaced apart from a boundary of one side surface of the radiator region 1110 by a second gap g2 at one point. The third boundary of the first side surfaces S1 may be spaced apart from a boundary of an upper side of the radiator region 1110 by a third gap g3 at one point. In some examples, a portion of the boundary of the upper side of the radiator region 1110 may be configured as a protrusion 1111. Accordingly, a gap between the first ground region 1150 and the radiator region 1110 at the protrusion 1111 may be implemented as g3', which is more reduced than the third gap g3. In this regard, as the gap from the ground region 1150 decreases, the impedance matching characteristic in the HB of the second band can be improved. In some examples, the third gap g3 may be larger than the second gap g2. Referring to FIGS. 6, 10, and 13A, the second gap g2 may be larger than the first gap g1.

In order to reduce or extend an electrical length of the antenna operating in the first band LB, the second boundary of the first side surfaces S1 of the first ground region 1150 and the boundary of the one side surface of the radiator region 1110 may be configured in the stepped structure. A length of the second boundary of the first side surfaces S1 of the first ground region 1150 may be denoted as L2.

As described above, since the second gap g2 and the third gap g3 is larger than the first gap g1, the resonant frequency adjustment and the impedance matching in the second band MB/HB can be achieved. In this regard, since the first ground region 1150 operates as the main radiator of the first band LB, the first gap g1 from the feeding line 1120 may be narrower than the second gap g2 and the third gap g3. On the other hand, the radiator region 1110 may operate as the main radiator of the second band MB/HB higher than the first band LB. Accordingly, the second gap g2 and the third gap g3 between the first ground region 1150 and the radiator region 1110 can be larger than the first gap g1. In FIGS. 6, 10, and 13A, gaps between different conductive patterns may be inconstant, and may be structured as a sum of sub patterns of various sizes, such as a stepped structure, in order to optimize the antenna performance.

Figure 13B:
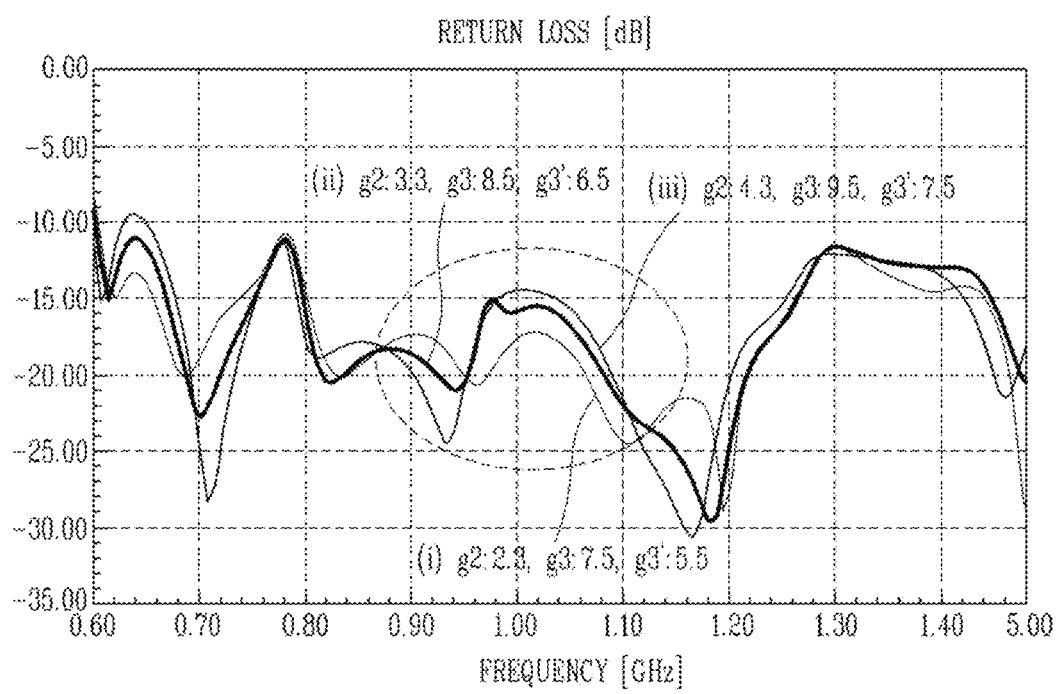
FIG. 13B illustrates a comparison of return loss characteristics according to a change in gap in the structure of the wideband CPW antenna of FIGS. 6 and 13A.

For example, a portion of the boundary of the upper side of the radiator region 1110 may be configured as a protrusion 1111. Accordingly, a gap between the first ground region 1150 and the radiator region 1110 at the protrusion 1111 may be defined as a gap g3', which is more reduced than the third gap g3. FIG. 13B illustrates a comparison of return loss characteristics according to a change in gap in the structure of the wideband CPW antenna of FIGS. 6 and 13A. As aforementioned, as the gap from the ground region 1150 decreases, the impedance matching characteristic in the HB of the second band can be improved.

Referring to FIGS. 6, 13A, 13B, as the third gap g3 and the gap g3' increase, the impedance matching characteristic in the second band can be improved. Therefore, the first structure (i) in which the third gap g3 and the gap g3' are reduced to 7.5 mm and 5.5 mm exhibits the best impedance matching in the second band, compared to the third structure (iii) in which the third gap g3 and the gap g3' are 9.5 mm and 7.5 mm.

In the wideband CPW antenna structure illustrated in FIG. 6, the first ground region 1150 may include the first region R1 corresponding to the upper region and the second region R2 corresponding to the lower region.

The first region R1 may correspond to the upper region, and have a linear structure in which its end portion is disposed on a line parallel to one axis on the second side surface S2. The second region R2 may correspond to a region lower than the first region R1 and may have an end portion that is shorter than the end portion of the first region R1. In some examples, the second region R2 may be spaced apart from the first feeding line 1120 and the one side surface of the radiator region 1110, and may be spaced apart from the upper side of the radiator region 1110.

As illustrated in (b) of FIG. 7, radiation is mainly performed through the second side surface S2 of the first region R1 of the first ground region 1150 in the first band. In addition, radiation is more performed through the second side surface S2 of the second region R2 of the first ground region 1150 in the first band. On the other hand, as illustrated in (b) of FIG. 8, radiation is mainly performed through edge regions on both sides of the radiator region 1120 in the second band. That is, radiation is mainly performed through one side of the radiator region 1120 spaced apart from the second side surface S2 of the first ground region 1150 by a predetermined gap in the second band. In other words, radiation is performed in the first band through the second side surfaces S2 of the first region R1 and the second region R2 of the first ground region 1150. Meanwhile, radiation is performed in the second band through the edge regions of the radiator region 1110 adjacent to the first side surface S1 of the second region R2 of the first ground region 1150.

Figure 14A:
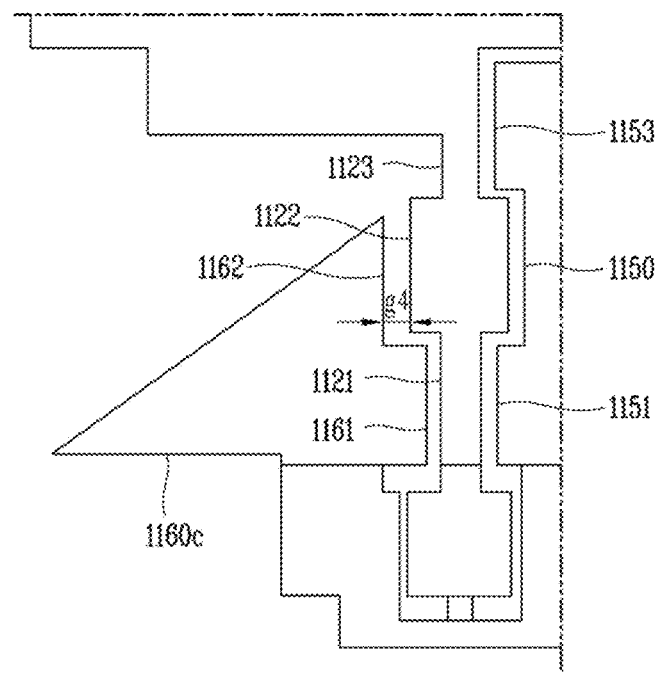
FIG. 14A is an enlarged view illustrating boundary parts between the first and second ground regions and the radiator region facing the first and second ground regions in the asymmetric wideband CPW antenna structure of FIG. 6.
Figure 14A:
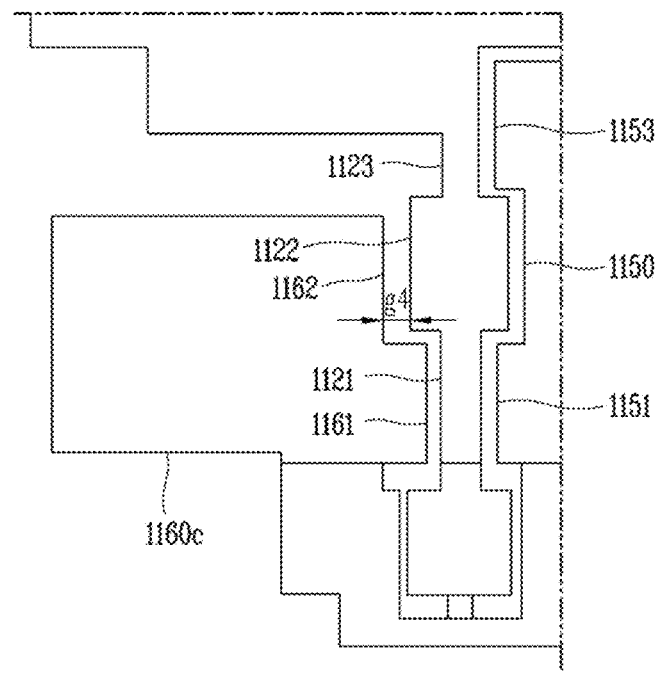

In the wideband CPW antenna structure, the first and second ground regions 1150 and 1160 may be configured in the asymmetric structure with being spaced apart from each other by the different gaps with respect to the feeding line 1120. FIG. 14A is an enlarged view illustrating the boundary parts between the first and second ground regions and the radiator region facing the first and second ground regions in the asymmetric wideband CPW antenna structure of FIG. 6.

Referring to FIGS. 6, 10, and 14A, the concave portion 1121 and the convex portion 1122 of the feeding line 1120 may be disposed to complementarily face the convex portion 1161 and the concave portion 1162 of the second ground region 1160. A boundary of the convex portion 1122 of the feeding line 1120 may be spaced apart from a boundary of the concave portion 1162 of the second ground region 1160 by a fourth gap g4. In some examples, the convex portion 1122 of the feeding line 1120 may be spaced apart from the first ground region 1150 by the first gap g1. In this regard, the fourth gap g4 may be larger than or equal to the first gap g1.

Referring to (a) of FIG. 14A, the second ground region 1160 may be formed in a triangular shape. The structure of the second ground region 1160 may not be limited thereto, and its outer boundary may alternatively be formed in a rectangular shape as illustrated in (b) of FIG. 14A.

Figure 14B:
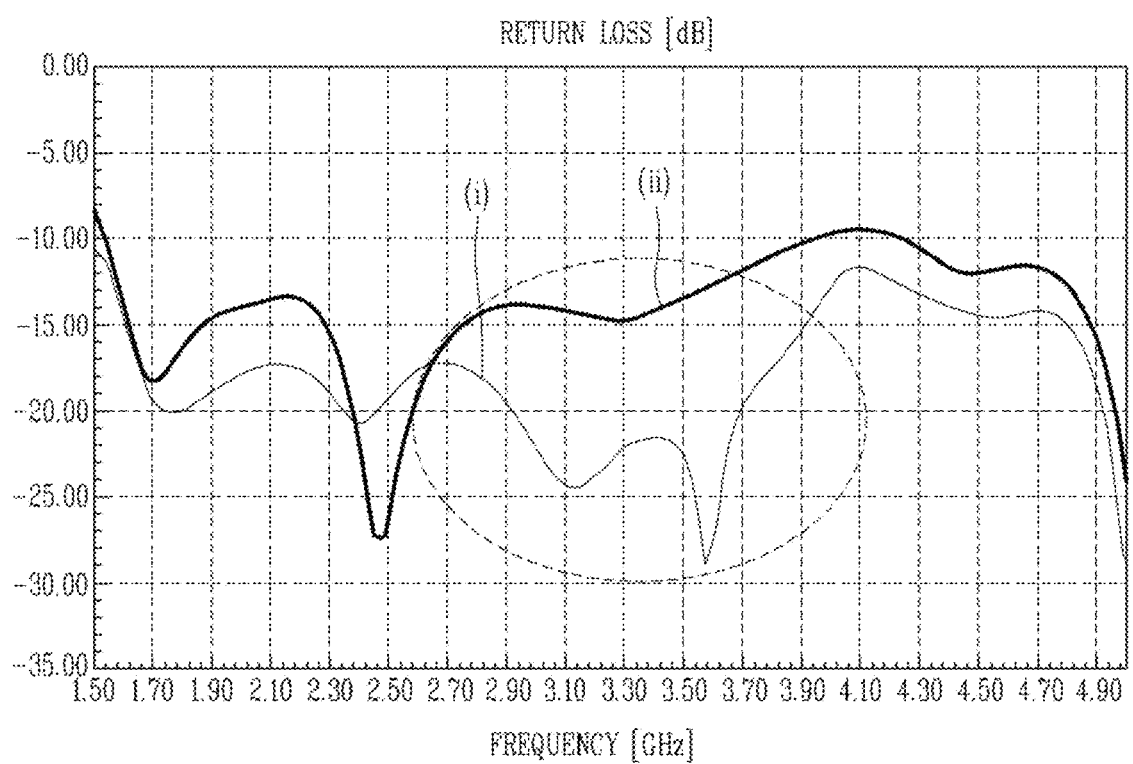
FIG. 14B illustrates a comparison of return loss characteristics according to a shape of a second ground region in the structure of the wideband CPW antenna of FIG. 14A.

FIG. 14B illustrates a comparison of return loss characteristics according to a shape of the second ground region 1160 in the structure of the wideband CPW antenna of FIG. 14A. Referring to FIG. 14B, the first structure (i) having the triangular second ground region 1160 has improved antenna resonance characteristics in the third band, compared to the second structure (ii). The second structure (ii) may include a second ground region 1160c having a rectangular outer boundary as illustrated in (b) of FIG. 14A.

In some examples, as the fourth gap g4 from the second ground region 1160 becomes narrower, the impedance matching characteristic in the UHB of the third band can be improved. The shape of the second ground region 1160 operating as a radiator in the third band corresponding to the UHB may be implemented in various shapes for resonant frequency adjustment and impedance matching. Referring to FIGS. 6 and 9 and (a) of FIG. 14A, the second ground region 1160 may be spaced apart from the boundary of the feeding line 1120 by the fourth gap g4. The second ground region 1160 may have a triangular shape in which its height is decreased from the boundary of the feeding line 1120 along one direction. Accordingly, the triangular second ground region 1160 may be configured such that a distance from the radiator region 1110 increases in the one direction.

Referring to the surface current distribution of (b) of FIG. 9, a signal of the third band gap-coupled from the feeding line 1120 may be radiated through an inclined edge region of the second ground region 1160, due to the second ground region 1160 having the triangular shape illustrated in of FIGS. 6 and 14A. Accordingly, the radio signal of the third band can be radiated through the one side region and the inclined edge region of the triangular second ground region 1160 which is spaced apart from the feeding line 1120 to be gap-coupled.

In addition to the second ground region 1160 having the triangular shape of FIGS. 6 and 9 and (a) of FIG. 14A, the second ground region may alternatively be formed in other shapes. Referring to (b) of FIG. 14A, a second ground region 1160c may be spaced apart from the boundary of the feeding line 1120 by the fourth gap g4. The second ground region 1160c may have an upper end portion in parallel with a lower end portion (lower side) of the radiator region 1110. Accordingly, an outer boundary of the second ground region 1160c may have a rectangular shape.

In some examples, even in the wideband CPW antenna structure according to the example of FIGS. 5A and 5B, the second ground region 1160a, 1160b may be spaced apart from the boundary of the feeding line 1120 by the fourth gap.

The second ground region 1160a, 1160b may have an upper end portion in parallel with the lower end portion (lower side) of the radiator region 1110. Accordingly, an outer boundary of the second ground region 1160a, 1160b may have a rectangular shape.

In this regard, the first gap between the feeding line 1120 and the first ground region 1150a, 1150b and the fourth gap between the feeding line 1120 and the second ground region 1160a, 1160b may be the same. As another example, the fourth gap may be different from the first gap in order to optimize antenna performance in the third band of the second ground region 1160a, 1160b. For example, the fourth gap between the feeding line 1120 and the second ground region 1160a, 1160b may be set to be larger than or equal to the first gap between the feeding line 1120 and the first ground region 1150a, 1150b.

Figure 15:
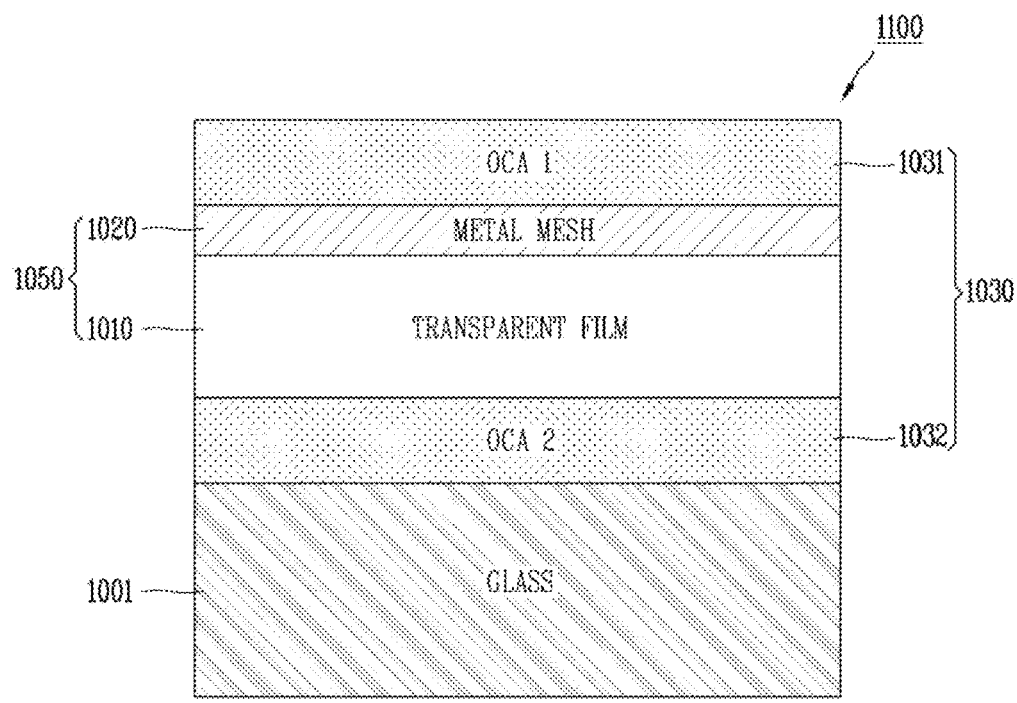
FIG. 15 illustrates a layered structure of an antenna assembly in which a transparent antenna implemented in the form of a metal mesh is disposed on glass and a mesh grid structure.
Figure 15:
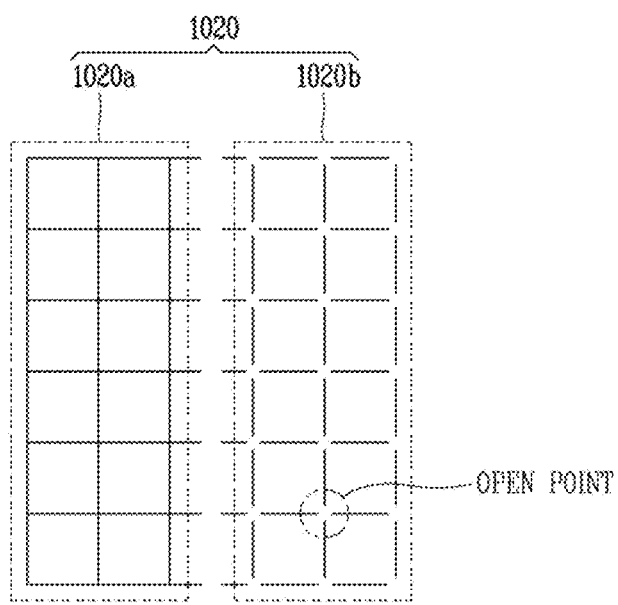

In some examples, the wideband dual polarized antenna structure may be implemented as a transparent antenna in the form of a metal mesh on glass or a display. FIG. 15 illustrates a layered structure of an antenna assembly in which a transparent antenna implemented in the form of a metal mesh is disposed on glass and a mesh grid structure.

Referring to (a) of FIG. 15, the layered structure of an antenna assembly on which the transparent antenna is disposed may include glass 1001, a dielectric substrate 1010, a metal mesh layer 1020, and an optical clear adhesive (OCA) layer 1030. The dielectric substrate 1010 may be implemented as a transparent film. The OCA layer 1030 may include a first OCA layer 1031 and a second OCA layer 1032.

The glass 1001 may be made of a glass material, and the second OCA layer 1032 serving as a glass attachment sheet may be attached to the glass 1001. As one example, the glass 1001 may have a thickness of about 3.5 to 5.0 mm, but is not limited thereto. The glass 1001 may constitute the front window 301 of the vehicle illustrated in FIGS. 1A and 1B.

The dielectric substrate 1010 made of the transparent film material may constitute a dielectric region at which conductive patterns of the upper metal mesh layer 1020 are disposed. The dielectric substrate 1010 may have a thickness of about 100 to 150 mm, but is not limited thereto.

The metal mesh layer 1020 may be formed by the plurality of metal mesh grids as illustrated in FIGS. 5A to 6 and (b) of FIG. 15. Conductive patterns may be configured such that the plurality of metal mesh grids operate as feeding lines or radiators. The metal mesh layer 1020 may constitute a transparent antenna region. As one example, the metal mesh layer 1020 may have a thickness of about 2 mm, but is not limited thereto.

The metal mesh layer 1020 may include a metal mesh grid 1020a and a dummy mesh grid 1020b. In some examples, the first OCA layer 1031 serving as a transparent film layer for protecting the conductive patterns from an external environment may be disposed on upper regions of the metal mesh grid 1020a and the dummy mesh grid 1020b.

The first OCA layer 1031 may be a protective sheet of the metal mesh layer 1020 and may be disposed on the upper region of the metal mesh layer 1020. As one example, the first OCA layer 1031 may have a thickness of about 20 to 40 mm, but is not limited thereto. The second OCA layer 1032 may be the glass attachment sheet and may be disposed on the upper region of the glass 1001. The second OCA layer 1032 may be disposed between the glass 1001 and the dielectric substrate 1010 made of the transparent film material. As one example, the second OCA layer 1032 may have a thickness of about 20 to 50 mm, but is not limited thereto.

Referring to FIGS. 5A to 6 and (b) of FIG. 15, the antenna assembly 1100 may be implemented as a transparent antenna. To this end, the radiator region 1110, 1110a, 1110b and the feeding line 1120, 1120a, 1120b may be formed by the metal mesh layer 1020 on which the plurality of grids are electrically connected. The first ground region 1150, 1150a, 1150b and the second ground region 1160, 1160a, 1160b may also be formed by the metal mesh layer 1020 on which the plurality of grids are electrically connected. On the other hand, the dummy mesh grid 1020b disposed at the dielectric region may be implemented as an open dummy pattern in which a plurality of grids are disconnected at connection points. Accordingly, the antenna assembly 1100, 1100a, 1100b may be implemented as the transparent antenna on the dielectric substrate 1010, and an entire region on which the dielectric substrate 1010 is disposed may be referred to as a transparent antenna region.

The transparent antenna region may be divided into an antenna pattern region and an open dummy region. The antenna pattern region may be defined by the metal mesh grid 1020a in which the plurality of grids are connected to one another. On the other hand, the open dummy region may be defined by the dummy mesh grid 1020b having an open dummy structure disconnected at the connection points. The radiator region 1110, 1110a, 1110b, the feeding line 1120, 1120a, 1120b, the first ground region 1150, 1150a, 1150b, and the second ground region 1160, 1160a, 1160b that constitute the transparent antenna may have a CPW structure disposed on the dielectric substrate 1010.

Figure 16A:
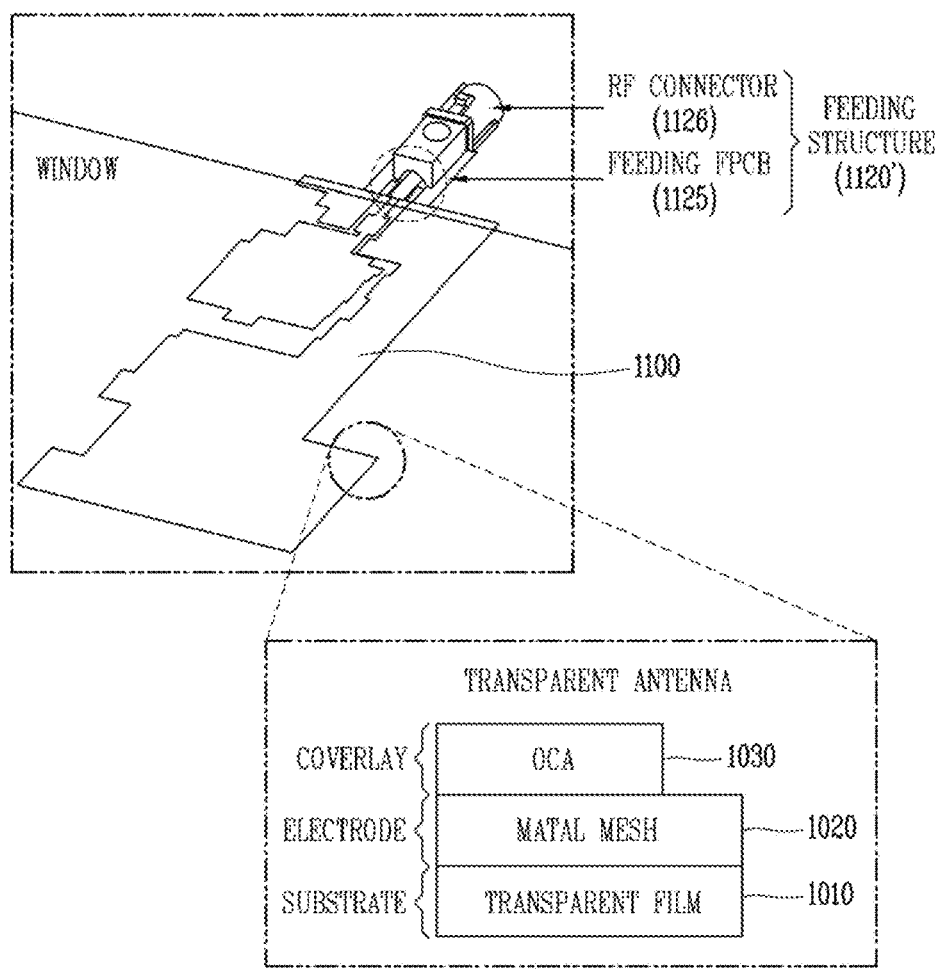
FIG. 16A illustrates that an antenna assembly disposed on a vehicle window as a transparent region or on a dielectric substrate attached to the window is coupled to a CPW transmission line and a connector structure which are disposed on a non-transparent region.
Figure 16B:
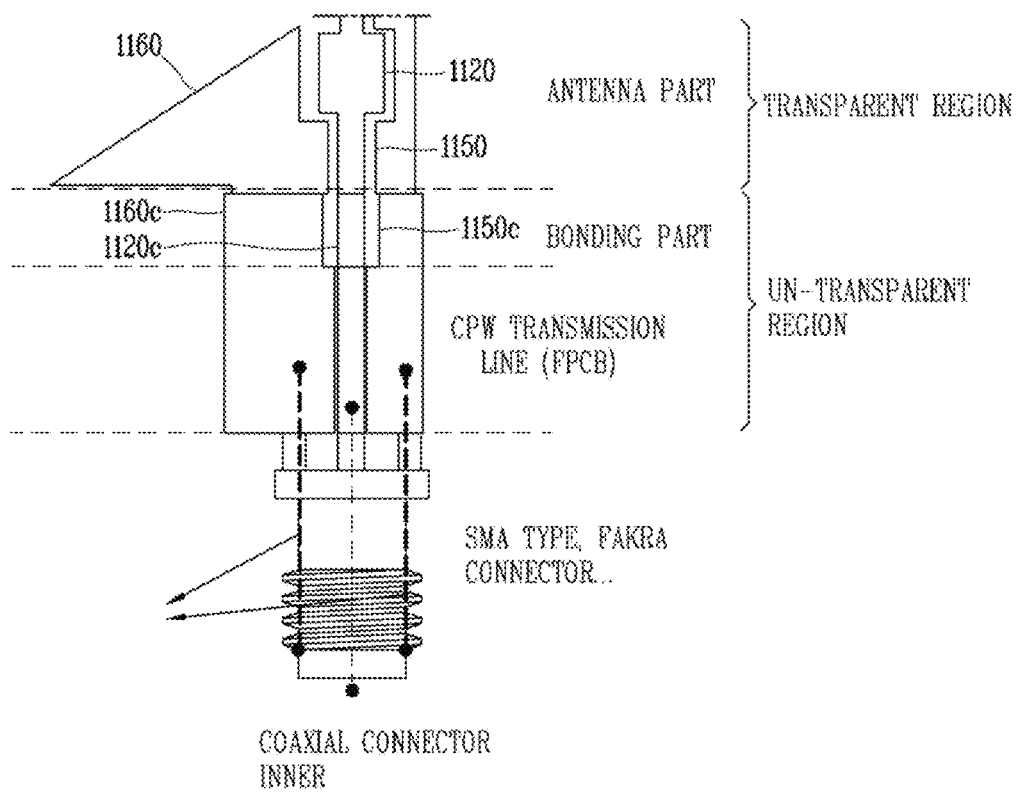
FIG. 16B is an enlarged view of a bonding part between the transparent region and the non-transparent region of FIG. 16A.

The antenna assembly 1100, 1100a, 1100b disposed on the vehicle window (glass) may be implemented as the transparent antenna. In some examples, the CPW transmission line for feeding power to the transparent antenna and its bonding part may be disposed at the non-transparent region. FIG. 16A illustrates a structure that an antenna assembly disposed on a vehicle as a transparent region or a dielectric substrate attached to the window is coupled to a CPW transmission line and a connector structure which are disposed at a non-transparent region. FIG. 16B is an enlarged view of a bonding part between the transparent region and the non-transparent region of FIG. 16A.

Referring to FIG. 6, (a) of FIG. 14A, and FIG. 16A, the CPW antenna structure implemented on the vehicle window is indicated by the antenna assembly 1100 having the CPW antenna structure of FIG. 6. However, it is not limited to the antenna assembly 1100 of FIG. 6 and may be replaced with the antenna assemblies 1100a and 1100b of FIGS. 5A and 5B. In some examples, a feeding structure 1120' may further include a feeding FPCB 1125 connected to the feeding line 1120, and an RF connector 1126.

Referring to the lateral view of the antenna assembly 1100, conductive patterns may be disposed in the form of the metal mesh 1020 on the transparent film 1010. In some examples, the OCA layer 1030 may be disposed on the conductive patterns formed of the metal mesh 1020, that is, on the radiator region 1110, the feeding line 1120, and the upper regions of the first and second ground regions 1150 and 1160.

Referring to FIGS. 6, 16A, and 16B, lower end portions of the feeding line 1120, the first ground region 1150 and the second ground region 1160 that constitute the transparent antenna may be connected on the same plane to a feeding line 1120c, a first ground 1150c, and a second ground 1160c of the bonding part, respectively. The feeding line 1120c, the first ground 1150c, and the second ground 1160c of the bonding part may be disposed at the non-transparent region. The feeding line 1120c, the first ground 1150c, and the second ground 1160*c* of the bonding part may constitute a CPW structure disposed on a second dielectric substrate 1010*b* different from the dielectric substrate 1010. The dielectric substrate 1010 may be implemented as a transparent substrate and the second dielectric substrate 1010*b* may be implemented as a non-transparent substrate.

The foregoing description has been given of the wideband antenna assembly implemented as the transparent antenna according to one aspect. Hereinafter, an antenna system for a vehicle having an antenna assembly according to another aspect will be described. An antenna assembly attached to the vehicle glass may be implemented as a transparent antenna.

Figure 17A:
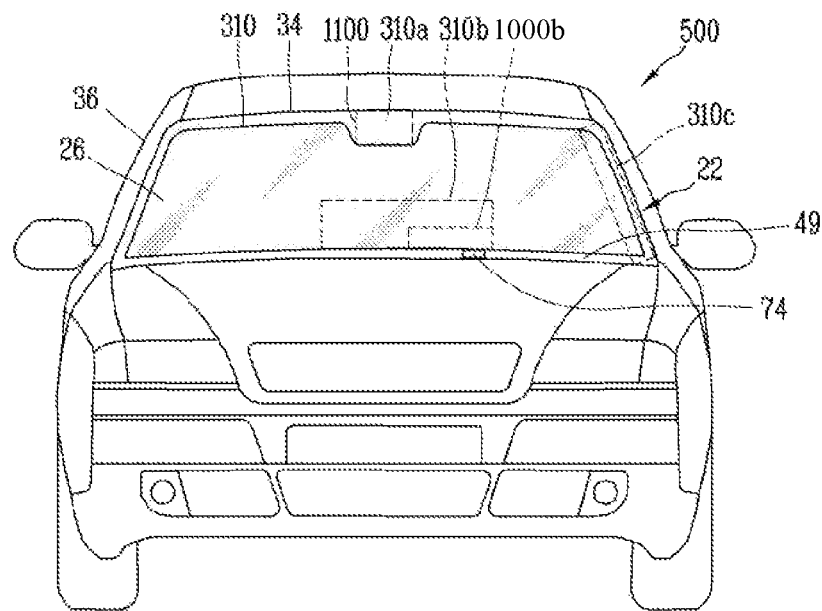
FIG. 17A is a front view of a vehicle in which a transparent antenna can be implemented on glass.
Figure 17B:
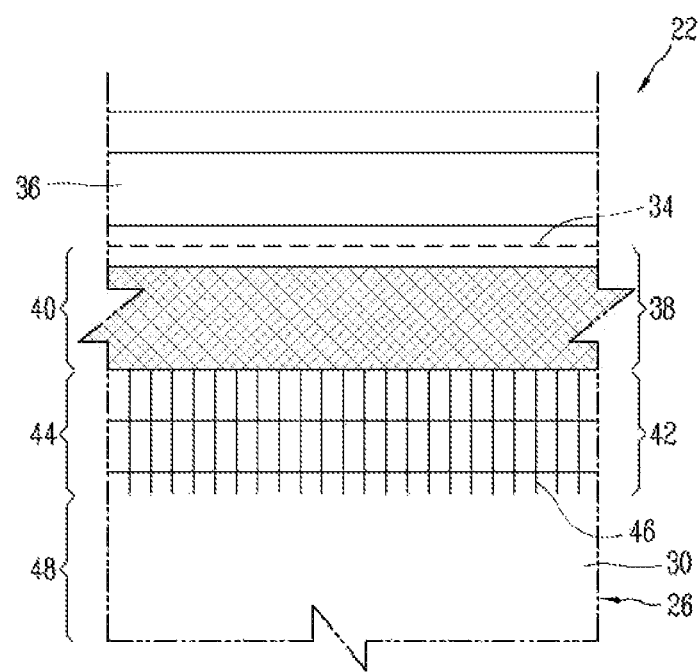
FIG. 17B illustrates a detailed configuration of a transparent glass assembly, in which a transparent antenna can be implemented.

FIG. 17A is a front view of a vehicle in which a transparent antenna can be implemented on glass. FIG. 17B illustrates a detailed configuration of a transparent glass assembly, in which a transparent antenna can be implemented.

Referring to FIG. 17A which is the front view of the vehicle 500, a configuration in which the transparent antenna for the vehicle can be disposed is illustrated. A pane assembly 22 may include an antenna disposed on an upper region 310*a*. Additionally, the pane assembly 22 may include a translucent pane glass 26 formed of a dielectric substrate. The antenna of the upper region 310*a* may support any one or more of a variety of communication systems.

The antenna disposed on the upper region 310*a* of the front window 310 of the vehicle may operate in a mid band MB, a high band HB, and a 5G Sub 6 band of 4G/5G communication systems. The front window 310 of the vehicle may be formed of the translucent pane glass 26. The translucent pane glass 26 may include a first part 38 at which the antenna and a portion of a feeder are formed, and a second part 42 at which another portion of the feeder and a dummy structure are formed. The translucent pane glass 26 may further include external regions 30 and 36 at which conductive patterns are not formed. For example, the outer region 30 of the translucent pane glass 26 may be a transparent region 48 formed to be transparent to secure light transmission and a field of view.

Although it is exemplarily illustrated that the conductive patterns can be formed at a partial region of the front window 310, another example may illustrate that the conductive patterns extend to the side glass 320 of FIG. 1B, the rear glass 330 of FIG. 3C, and an arbitrary glass structure. An occupant or driver in the vehicle 20 can see roads and surrounding environments through the translucent pane glass 26 generally without obstruction by the antenna disposed at the upper region 310*a*.

Referring to FIGS. 17A and 17B, the antenna disposed at the upper region 310*a* may include a first part 38 corresponding to an entire first region 40 of the translucent pane glass 26, and a second part 42 corresponding to an entire second region 44 of the translucent pane glass 26 located adjacent to the first region 40. The first part 38 may have a greater density (i.e., a larger grid structure) than the second part 42. Because the density of the first part 38 is greater than the density of the second part 42, the first part 38 may be perceived to be more transparent than the second part 42. Also, antenna efficiency of the first part 38 may be higher than antenna efficiency of the second part 42.

Accordingly, it may also be configured such that an antenna radiator is disposed at the first part 38 and a dummy radiator (dummy portion) is disposed at the second part 42. When the antenna assembly 1100 is implemented at the first part 38 that is the upper region 310*a* of the front glass 310 of the vehicle, the dummy radiator or a portion of the feeding line may be disposed at (attached to) the second part 42.

In this regard, the antenna region may be implemented at the upper region 310*a* of the front glass 310 of the vehicle. The conductive patterns in the form of the metal mesh grid constituting the antenna may be disposed at the first part 38. In some examples, a dummy mesh grid may be disposed at the first part 38 for visibility. In addition, in view of maintaining transparency between the first part 38 and the second part 42, conductive patterns in the form of the dummy mesh grid may also be disposed at the second part 42. An interval between mesh grids 46 disposed at the second part 42 may be wider than an interval between mesh grids disposed at the first part 38.

Conductive mesh grids disposed at the first part 38 of the antenna disposed at the upper region 310*a* may extend up to a region including a peripheral part 34 and the second part 42 of the translucent pane glass 26. The antenna of the upper region 310*a* may extend in one direction along the peripheral part 34.

The antenna assembly 1100 such as the transparent antenna may be disposed at the upper region 310*a* of the front glass 310 of the vehicle, but is not limited thereto. When the antenna assembly 1100 is disposed at the upper region 310*a* of the front glass 310, the antenna assembly 1100 may extend up to an upper region 47 of the translucent pane glass 26. The upper region 47 of the translucent pane glass 26 may have lower transparency than other portions. A part of the feeder and other interface lines may be disposed at the upper region 47 of the translucent pane glass 26. When the antenna assembly 1100 is disposed at the upper region 310*a* of the front glass 310 of the vehicle, the antenna assembly 1100 may cooperate with the second antenna system 1000*b* of FIGS. 3A to 3C.

The antenna assembly 1100 may be disposed at the lower region 310*b* or the side region 310*c* of the front glass 310 of the vehicle. When the antenna assembly 1100 is disposed at the lower region 310*b* of the front glass 310 of the vehicle, the antenna assembly 1100 may extend up to a lower region 49 of the translucent pane glass 26. The lower region 49 of the translucent pane glass 26 may have lower transparency than other portions. A part of the feeder and other interface lines may be disposed at the lower region 49 of the translucent pane glass 26. A connector assembly 74 may be disposed at the lower region 49 of the translucent pane glass 26.

When the antenna assembly 1100 is disposed at the lower region 310*b* or the side region 310*c* of the front glass 310 of the vehicle, the antenna assembly 1100 may cooperate with the internal antenna system 1000 of the vehicle illustrated in FIGS. 3A to 3C. However, the cooperation configuration between the antenna system 1000 and the second antenna system 1000*b* is not limited thereto and may vary depending on applications. In some examples, the antenna assembly 1100 may alternatively be disposed at the side glass 320 of the vehicle of FIG. 1B.

Figure 18:
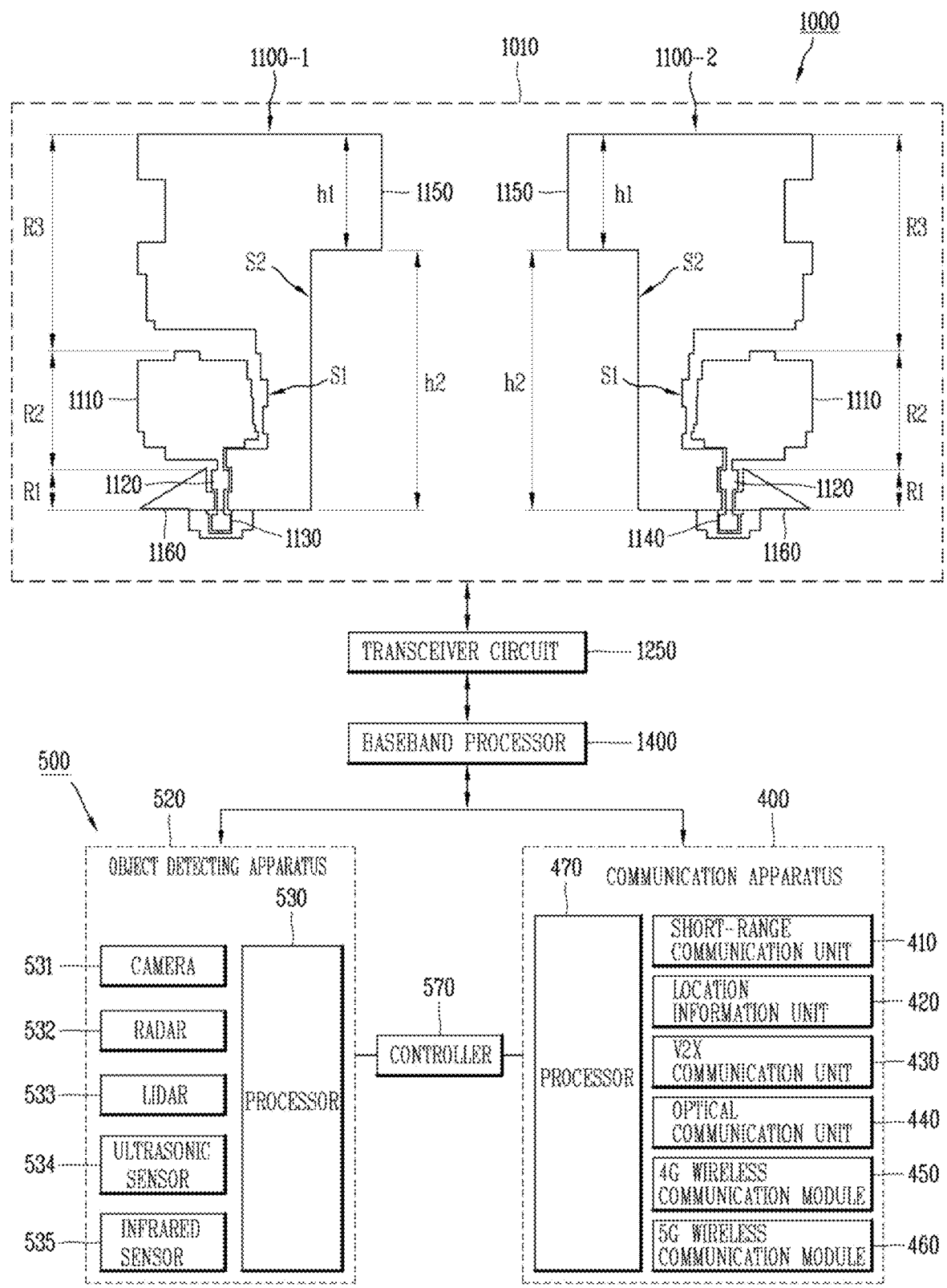
FIG. 18 is a block diagram illustrating a configuration of a vehicle to which a vehicle antenna system is mounted, according to one example.

Referring to FIGS. 1A to 17B, the antenna system 1000 for the vehicle including the antenna assembly 1100 may include a transparent pane assembly 1050 of FIG. 15. FIG. 18 is a block diagram illustrating a configuration of a vehicle on which a vehicle antenna system is mounted, according to an example.

Referring to FIGS. 1A to 18, the vehicle 500 may include the vehicle antenna system 1000. Referring to FIGS. 1A, 1B, and 17A, the vehicle 500 may include a conductive vehicle body operating as an electrical ground.

The antenna system 1000 may include the antenna assembly 1100 disposed at the transparent pane assembly 1050. Referring to FIG. 15, the antenna assembly 1100 may include the dielectric substrate 1010 and the metal mesh layer 1020, but is not limited thereto.

The antenna system 1000 may include glass 1001, a dielectric substrate 1010, a radiator region 1110, 1110a, 1110b disposed on a metal mesh layer 1020, a feeding line 1120, 1120a, 1120b, a first ground region 1150, 1150a, 1150b, and a second ground region 1160, 1160a, 1160b.

The antenna system 1000 may further include a first feeding line 1130, a second feeding line 1140, and a connection line 1150.

The glass 1001 may constitute a window of the vehicle. The glass 1001 may be attached to the dielectric substrate 1010 made of the transparent film material through the OCA layer 1032. The dielectric substrate 1010 may be attached to the glass 1001 and configured to form conductive patterns in the form of the mesh grid.

The antenna assembly 1100 implemented on the dielectric substrate 1010 and the metal mesh layer 1020 may implement an antenna pattern including a plurality of conductive patterns. The antenna pattern may include the radiator region 1110, 1110a, 1110b, the feeding line 1120, 1120a, 1120b, the first ground region 1150, 1150a, 1150b, and the second ground region 1160, 1160a, 1160b.

The radiator region 1110, 1110a, 1110b may be implemented as conductive patterns on the dielectric substrate 1010 to radiate radio signals. When the antenna assembly 1100, 1100a, 1100b is implemented as a transparent antenna, the conductive patterns may be configured as the metal mesh grid 1020a. That is, the antenna assembly 1100 may be implemented as the metal mesh grid 1020a configured to interconnect a plurality of grids. On the other hand, the dummy mesh grid 1020b disposed at the dielectric region may be implemented as an open dummy pattern in which a plurality of grids are disconnected at connection points.

The feeding line 1120, 1120a, 1120b may be configured to apply a signal on the same plane as the conductive patterns of the radiator region 1110, 1110a, 1110b. Accordingly, since the radiator region 1110, 1110a, 1110b and the feeding line 1120, 1120a, 1120b are disposed on the same plane, a CPW antenna structure can be implemented.

The first ground region 1150, 1150a, 1150b may be disposed at one side surface of the radiator region 1110, 1110a, 1110b at one side of the feeding line 1120, 1120a, 1120b and also disposed at an upper side of the radiator region 1110, 1110a, 1110b in one axial direction. The one axial direction may be a y-axial direction, but may not be limited thereto. Although it is illustrated that the first ground region 1150, 1150a, 1150b is disposed at the upper side of the radiator region 1110, 1110a, 1110b, the present disclosure may not be limited thereto. The first ground region 1150, 1150a, 1150b may alternatively disposed at one side, another side or a lower side of the radiator region 1110, 1110a, 1110b depending on an angle at which the antenna assembly 1100, 1100a, 1100b is disposed.

The second ground region 1160, 1160a, 1160b may be disposed at a lower side of the radiator region 1110, 1110a, 1110b in one axial direction at another side of the feeding line 1120, 1120a, 1120b. Accordingly, a length of the second ground region 1160, 1160a, 1160b in the one axis may be shorter than a length of the first ground region 1150, 1150a, 1150b in the one axis. The one axial direction may be a y-axial direction, but may not be limited thereto. Although it is illustrated that the first ground region 1160, 1160a, 1160b is disposed at the lower side of the radiator region 1110, 1110a, 1110b, the present disclosure may not be limited thereto. The second ground region 1150a, 1150b may alternatively disposed at one side, another side or an upper side of the radiator region 1110a, 1110b depending on an angle at which the antenna assembly 1100a, 1100b is disposed.

The wideband CPW antenna may operate as a wideband antenna by the configuration that the conductive patterns radiate radio signals at different bands. The first ground region 1150, 1150a, 1150b may be configured to radiate a signal of a first band. The radiator region 1110, 1110a, 1110b may be configured to radiate a signal of a second band that is higher than the first band. In some examples, the second ground region 1160, 1160a, 1160b may be configured to radiate a signal of a third band that is higher than the second band.

The first ground region 1150, 1150a, 1150b may include first side surfaces S1, S1a, S1b spaced apart from the feeding line 1120, 1120a, 1120b and the radiator region 1110, 1110a, 1110b, and second side surfaces S2, S2a, S2b that are another side surfaces of the first side surfaces S1, S1a, S1b. Boundaries of the first side surfaces S1, S1a, S1b may be disposed on the same plane to be spaced apart different gaps from a boundary of the one side surface of the radiator region 1110, 1110a, 1110b and a boundary of the upper side of the radiator region 1110, 1110a, 1110b. Also, the boundaries of the first side surfaces S1, S1a, S1b or the boundaries of the second side surfaces S2, S2a, S2b may be recessed.

Referring to FIG. 5A, one side surface of the radiator region 1110a and the first side surface of the first ground region 1150a may face each other with being spaced apart from each other at the same gap. Alternatively, referring to FIG. 5B, one side surface of the radiator region 1110b and the first side surface of the first ground region 1150b may have a stepped structure with being spaced apart from each other by different gaps.

An end portion of another side surface of the radiator region 1110a, 1110b may have a stepped structure having different lengths. The stepped structure of the radiator region 1110a, 1110b can thus optimize antenna performance at sub bands of the second band. Accordingly, an operating bandwidth of the radiator region 1110a, 1110b can cover an entire band of the second band.

Referring to FIGS. 5A to 9, in the configuration of the wideband CPW antenna, the first side surfaces S1, S1a, S1b of the first ground region 1150, 1150a, 1150b may include first to third boundaries.

The first boundary of the first side surfaces S1, S1a, S1b may be spaced apart from a boundary of the feeding line 1120, 1120a, 1120b to face each other. The second boundary of the first side surfaces S1, S1a, and S1b may be spaced apart from a boundary of the one side surface of the radiator region 1110, 1110a, 1110b to face each other. The third boundary of the first side surfaces S1, S1a, S1b may be spaced apart from a boundary of the upper side of the radiator region 1110, 1110a, 1110b to face each other. Accordingly, the first side surfaces S1, S1a, S1b of the first ground region 1150, 1150a, 1150b may be disposed adjacent to different edge portions of the feeding line 1120, 1120a, 1120b and the radiator region 1110, 1110a, 1110b. This can minimize the wideband CPW antenna and enable a wideband operation.

In some examples, the transparent antenna implemented as the wideband CPW antenna may operate in a plurality of frequency bands. In addition, the transparent antenna implemented as the wideband CPW antenna may include a plurality of antenna elements. As illustrated in FIG. 18, the transparent antenna may include a first antenna element 1100-1 and a second antenna element 1100-2 that are spaced apart from each other by a predetermined distance. Although the first and second antenna elements 1100-1 and 1100-2 illustrated in FIG. 18 is implemented as the antenna elements of FIG. 6, but may not be limited to this, and may alternatively be implemented as the antenna elements of FIG. 5A or 5B. In some examples, the first and second antenna elements 1100-1 and 1100-2 may be disposed symmetrically on the dielectric substrate 1010, but may not be limited thereto. As another example, the first and second antenna elements 1100-1 and 1100-2 may be disposed to be rotated at a predetermined angle or may be disposed in a general arrangement structure to which no rotation or symmetrical structure is applied.

In some examples, the feeding line 1120, 1120a, 1120b, the radiator region 1110, 1110a, 1110b, the first ground region 1150, 1150a, 1150b, and the second ground region 1160, 1160a, 1160b may constitute the antenna module 1100. The configuration of FIG. 18 has been described with reference to the configuration of FIG. 6 for the sake of explanation, but may not be limited thereto, and may alternatively be implemented as the configuration of FIG. 5A or 5B.

The antenna system 1000 for the vehicle may include a transceiver circuit 1250 and a processor 1400. The transceiver circuit 1250 may be operably coupled to the antenna module 1100 through the feeding line 1120. The transceiver circuit 1250 may control an internal electronic component to radiate a radio signal of at least one of the first to third bands through the antenna module 1100. To this end, the transceiver circuit 1250 may adjust a frequency of an internal oscillator and control operating modes and/or operating frequencies of a power amplifier and a low noise amplifier. The processor 1400 may be operably coupled to the transceiver circuit 1250 and may be configured to control the transceiver circuit 1250.

The processor 1400 may control the transceiver circuit 1250 so that radio signals of different bands are applied to the feeding line 1120, so as to perform Carrier Aggregation (CA) or Dual Connectivity (DC) through the antenna module 1100. In this regard, the radio signal of the first band may be radiated through the first ground region 1150, 1150a, 1150b. The radio signal of the second band may be radiated through the radiator region 1120, 1120a, 1120b. The radio signal of the third band may be radiated through the first ground region 1160, 1160a, 1160b.

The processor 1400 may apply a first radio signal and a second radio signal of the same band to the first antenna ANT1 and the second antenna ANT2 and control the transceiver circuit 1250 to perform MIMO through the first antenna ANT1 and the second antenna ANT2. Accordingly, the processor 1400 can control the transceiver circuit 1250 to perform 2×2 MIMO. In some examples, the processor 1400 may control the transceiver circuit 1250 to perform 4×4 MIMO through the first antenna element 1100-1 and the second antenna element 1100-2.

In some examples, Carrier Aggregation (CA) operation and/or Dual Connectivity (DC) operation may be carried out using the wideband dual polarized antenna. In this regard, the processor 1400 may control the transceiver circuit 1250 to apply a first radio signal and a second radio signal of different bands to the first antenna ANT1 and the second antenna ANT2.

To this end, different RF chains may be connected to different ports of one antenna element. Accordingly, a first RF chain of the transceiver circuit 1250 may apply the first signal of the first band to the third feeding line 1130. On the other hand, a second RF chain of the transceiver circuit 1250 may apply the second signal of the second band to the fourth feeding line 1140. Accordingly, the CA operation and/or the DC operation can be carried out by combining (the signals of) the different bands using the single antenna element.

The foregoing description has been given of a wideband antenna assembly disposed in a vehicle and an antenna system for a vehicle having the same have been described. Hereinafter, technical effects of the wideband antenna assembly disposed in the vehicle and the antenna system for the vehicle having the same will be described.

In some implementations, an antenna made of a transparent material that operates in a wideband range capable of providing LTE and 5G communication services can be provided by allowing grounds asymmetrically disposed at both sides of a radiator region to operate in different bands.

In some implementations, a transparent antenna made of a transparent material, which has a radiator region including conductive patterns of a stepped structure with different widths so as to form multiple resonance points and can operate in a wideband range, can be provided.

In some implementations, an entire size of a transparent antenna and a feeding loss can be minimized by minimizing a length of feeding lines.

In some implementations, an antenna structure made of a transparent material that can be minimized in antenna size while operating in a wideband range by employing a CPW feeding structure and a radiator structure, in which ground regions are formed in an asymmetric structure, can be provided.

In some implementations, an antenna structure of a transparent material, which can obtain improved antenna efficiency and transparency while operating in a wideband range by implementing conductive patterns in a metal mesh structure and defining a dummy pattern even at a dielectric region, can be provided.

In some implementations, a structure, in which an antenna structure made of a transparent material with improved antenna efficiency while operating in a wideband range can be disposed at various positions, such as an upper, lower, or side region of a front window of a vehicle, can be provided.

In some implementations, communication performance can be improved by arranging a plurality of transparent antennas on glass of a vehicle or a display of an electronic device.

Further scope of applicability of the present disclosure will become apparent from the following detailed description. It should be understood, however, that the detailed description and specific examples, such as the preferred embodiment of the invention, are given by way of illustration only, since various changes and modifications within the spirit and scope of the invention will be apparent to those skilled in the art.

In relation to the aforementioned disclosure, design and operations of a transparent antenna operating in a wideband range and a vehicle controlling the same can be implemented as computer-readable codes in a program-recorded medium. The computer-readable media includes all types of recording devices in which data readable by a computer system can be stored. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller of the terminal. Therefore, the detailed description should not be limitedly construed in all of the aspects, and should be understood to be illustrative. Therefore, all changes and modifications that fall within the metes and bounds of the claims, or equivalents of such metes and bounds are therefore intended to be embraced by the appended claims.

What is claimed is:

1. An antenna assembly configured to be installed in a vehicle and comprising:
a dielectric substrate;
a radiator region configured as conductive patterns on the dielectric substrate and configured to radiate a radio signal,
wherein the conductive patterns of the radiator region are formed on the dielectric substrate as a metal mesh grid having a plurality of openings;
a plurality of dummy mesh grid patterns formed at an outside portion of the conductive patterns of the radiator region,
wherein the conductive patterns comprise:
a first conductive pattern that includes a first portion and a second portion electrically connected with a feeding portion;
a second conductive pattern electrically connected with an electrical ground; and
a third conductive pattern electrically connected with the electrical ground,
wherein a size of the second conductive pattern is smaller than a size of the third conductive pattern,
wherein, upon installation in the vehicle, the radiator region comprises a first region that is beneath a second region that is beneath a third region in a vertical direction,
wherein the second portion of the first conductive pattern is disposed between the second conductive pattern and a first portion of the third conductive pattern in a horizontal direction of the first region;
wherein the first portion of the first conductive pattern and a second portion of the third conductive pattern is disposed in the second region,
wherein a third portion of the third conductive pattern disposed in the third region comprises a first sub region, a second sub region and a third sub region,
wherein the second portion of the first conductive pattern is disposed between the second conductive pattern and the first sub region of the third portion of thethird conductive pattern in the vertical direction,
wherein the second sub region of the third portion of the third conductive pattern is disposed between the first sub region of the third portion of the third conductive pattern and the third sub region of the third portion of the third conductive pattern,
wherein the second sub region of the third portion of the third conductive pattern is connected with the second portion of the third conductive pattern,
wherein a height of the third sub region of the third portion of the third conductive pattern is smaller than a height of the second sub region of the third portion of the third conductive pattern, and
wherein the third sub region of the third portion of the third conductive pattern is disposed near the plurality of dummy mesh grid patterns in the vertical direction.

2. The antenna assembly of claim 1,
wherein one side surface of the first conductive pattern and a first side surface of the third conductive pattern are formed in a linear structure to face each other with being spaced apart from each other by the same gap, and
wherein another side surface of the first conductive pattern has a stepped structure.

3. The antenna assembly of claim 1,
wherein one side surface of the first conductive pattern and a first side surface of the third conductive pattern are spaced apart from each other by different gaps, and
wherein another side surface of the first conductive pattern has a stepped structure.

4. The antenna assembly of claim 3,
wherein a first boundary of the first side surfaces faces a boundary of the second portion of the first conductive pattern while being spaced apart therefrom,
wherein a second boundary of the first side surfaces faces a boundary of the first portion of the first conductive pattern while being spaced apart therefrom, and
wherein a third boundary of the first side surfaces faces a boundary of an upper side of the first portion of the first conductive pattern while being spaced apart therefrom.

5. The antenna assembly of claim 4,
wherein the first boundary of the first side surfaces is spaced apart from the boundary of the second portion of the first conductive pattern by a first gap,
wherein the second boundary of the first side surfaces is spaced apart from the boundary of the first portion of the first conductive pattern by a second gap,
wherein the third boundary of the first side surfaces is spaced apart from a boundary of the upper side of the first conductive by a third gap, and
wherein the third gap is larger than the second gap, and the second gap is larger than the first gap.

6. The antenna assembly of claim 5,
wherein the second portion of the first conductive pattern has a first width at a first point and a second width at a second point,
wherein the first width and the second width are different from each other.

7. The antenna assembly of claim 5,
wherein the boundary of the second portion of the first conductive pattern have a concave portion and a convex portion,
wherein a boundary of the second conductive pattern have a convex portion and a concave portion,
wherein the boundary of the second portion of the first conductive pattern is disposed to face the boundary of the second conductive pattern,
wherein the boundary of the second portion of the first conductive pattern are spaced apart from the boundary of the second conductive pattern by a fourth gap, and
wherein the fourth gap is larger than the first gap.

8. The antenna assembly of claim 5,
wherein the boundary of the second portion of the first conductive pattern are spaced apart from the boundary of the second conductive pattern by a fourth gap, and
wherein the second conductive pattern is formed in a rectangular shape having an end portion in parallel to a lower side of the first portion of the first conductive pattern.

9. The antenna assembly of claim 1,
wherein the boundary of the second portion of the first conductive pattern are spaced apart from the boundary of the second conductive pattern by a fourth gap, and wherein the second conductive pattern is formed in a triangular shape having a height decreasing from the boundary of the second portion of the first conductive pattern.

10. The antenna assembly of claim 1,
wherein a width of the third portion of the third conductive pattern is bigger than a width of the first portion of the third conductive pattern, and
wherein the width of the first portion of the third conductive pattern is bigger than a width of the second portion of the third conductive pattern.

11. The antenna assembly of claim 1,
wherein a side surface of the third conductive pattern further comprises a recessed portion and a protruded portion,
wherein the side surface of the third conductive pattern is opposite side of the first conductive pattern,
wherein the recessed portion is disposed at a lower portion of the third conductive pattern,
wherein the protruded portion is disposed at an upper portion of the third conductive pattern,
wherein a height of the recessed portion is higher than a height of the protruded portion.

12. The antenna assembly of claim 1, wherein the first conductive pattern, the second conductive pattern, and the third conductive pattern form a Coplanar Waveguide (CPW) structure on the dielectric substrate.

13. The antenna assembly of claim 1,
wherein the plurality of dummy mesh grid pattern are not connected with the feeding portion and the ground, and
wherein the plurality of dummy mesh grid pattern are separated with each other.

14. An antenna system for a vehicle that comprises a conductive vehicle body operating as an electrical ground, the antenna system comprising:
glass constituting a window of the vehicle;
a dielectric substrate attached to the glass;
a radiator region configured as conductive patterns on the dielectric substrate and configured to radiate a radio signal,
wherein the conductive patterns of the radiator region are formed on the dielectric substrate as a metal mesh grid having a plurality of openings;
a plurality of dummy mesh grid patterns formed at an outside portion of the conductive patterns of the radiator region,
wherein the conductive patterns comprise:
a first conductive pattern that includes a first portion and a second portion electrically connected with a feeding portion;
a second conductive pattern electrically connected with an electrical ground; and
a third conductive pattern electrically connected with the electrical ground,
wherein a size of the second conductive pattern is smaller than a size of the third conductive pattern,
wherein, upon installation in the vehicle, the radiator region comprises a first region that is beneath a second region that is beneath a third region in a vertical direction,
wherein the second portion of the first conductive pattern is disposed between the second conductive pattern and a first portion of the third conductive pattern in a horizontal direction of the first region;
wherein the first portion of the first conductive pattern and a second portion of the third conductive pattern is disposed in the second region,
wherein a third portion of the third conductive pattern disposed in the third region comprises a first sub region, a second sub region and a third sub region,
wherein the second portion of the first conductive pattern is disposed between the second conductive pattern and the first sub region of the third portion of the third conductive pattern in the vertical direction,
wherein the second sub region of the third portion of the third conductive pattern is disposed between the first sub region of the third portion of the third conductive pattern and the third sub region of the third portion of the third conductive pattern,
wherein the second sub region of the third portion of the third conductive pattern is connected with the second portion of the third conductive pattern,
wherein a height of the third sub region of the third portion of the third conductive pattern is smaller than a height of the second sub region of the third portion of the third conductive pattern, and
wherein the third sub region of the third portion of the third conductive pattern is disposed near the plurality of dummy mesh grid patterns in the vertical direction.

* * * * *